US012743560B2

(12) United States Patent
Burdzy

(10) Patent No.: US 12,743,560 B2
(45) Date of Patent: Sep. 22, 2026

(54) AUTOMATED STAMPING PART DESIGN

(71) Applicant: DASSAULT SYSTEMES, Velizy Villacoublay (FR)

(72) Inventor: Benoit Burdzy, Aix-en-Provence (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 1014 days.

(21) Appl. No.: 17/966,473

(22) Filed: Oct. 14, 2022

(65) Prior Publication Data

US 2023/0119067 A1 Apr. 20, 2023

(30) Foreign Application Priority Data

Oct. 15, 2021 (EP) .................................... 21306453

(51) Int. Cl.
*G06F 30/10* (2020.01)
*G06F 113/24* (2020.01)

(52) U.S. Cl.
CPC .......... *G06F 30/10* (2020.01); *G06F 2113/24* (2020.01)

(58) Field of Classification Search
CPC ...... G06F 30/00; G06F 30/10; G06F 2113/24; G06F 30/15; G06F 30/17; G06F 30/12; B21D 22/02
USPC .............................................................. 703/2
See application file for complete search history.

(56) References Cited

U.S. PATENT DOCUMENTS 8,836,701 B1 * 9/2014 Rockwood ............. G06F 30/10 345/441

FOREIGN PATENT DOCUMENTS

EP 3690682 A1 * 8/2020 ............. G06F 30/15
WO WO-2015061884 A1 * 5/2015 ............. B21D 22/20

OTHER PUBLICATIONS

Wang, Cheng-Hua et al., "BendCad: A Design System for Concurrent Multiple Representations of Parts", 1996, Journal of Intelligent Manufacturing 7, Chapman & Hall. (Year: 1996).*
Extended European Search Report issued Mar. 10, 2022 in European Patent Application No. 21306453.8 filed Oct. 15, 2021, 8 pages.

* cited by examiner

*Primary Examiner* — Cedric Johnson
(74) *Attorney, Agent, or Firm* — Oblon, McClelland, Maier & Neustadt, L.L.P.

(57) ABSTRACT

A stamping part design method including obtaining a first B-rep model having a 3D boundary curve formed by boundary-curve edges and obtaining a first and second value representing a g1-continuity and a g2-continuity extrapolation length requirement. The method includes determining a second B-Rep model comprising an extrapolation of the first B-Rep model and presenting at least a g2-continuity over a length of the extrapolation patches equal to the second value and then at least a g1-continuity over a length of the extrapolation patches equal to the first value. The determination of the second B-Rep model includes partitioning the boundary-curve edges into first groups of consecutive first boundary-curve edges, and second groups of consecutive second boundary-curve edges and applying a surface-extension operator to each first group and filling the gaps. This forms an improved solution of stamping part design.

20 Claims, 31 Drawing Sheets

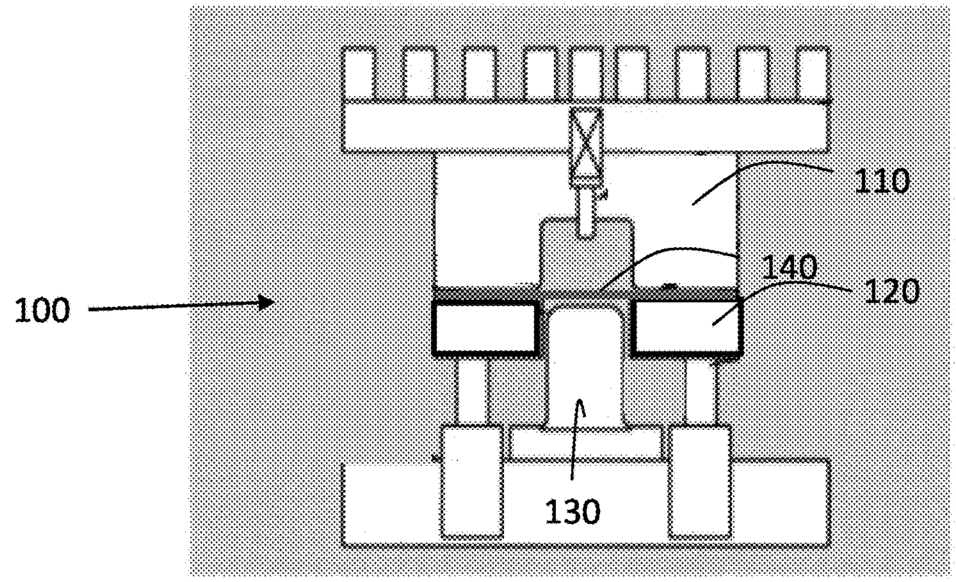
FIG. 1A
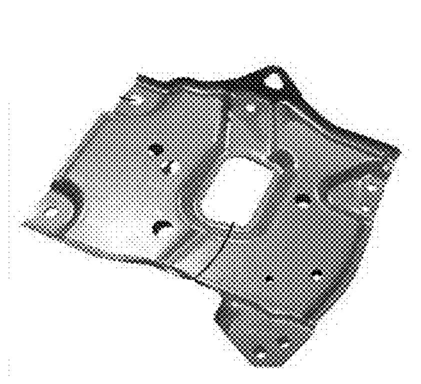
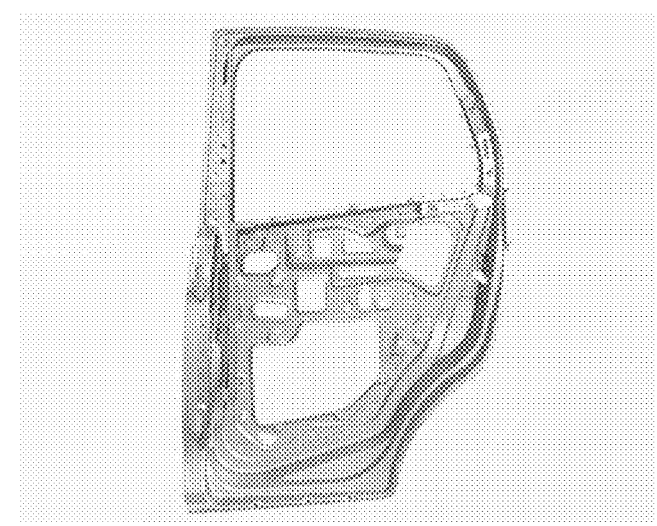
FIG. 1B
FIG. 1C

AUTOMATED STAMPING PART DESIGN

CROSS REFERENCE TO RELATED APPLICATIONS

This application claims priority under 35 U.S.C. § 119 or 365 to European Application No. 21306453.8, filed Oct. 15, 2021. The entire contents of the above application are incorporated herein by reference.

TECHNICAL FIELD

The disclosure relates to the field of computer programs and systems, and more specifically to a method, system and program for designing a stamping part having one or more flanges, and to a process for manufacturing such a stamping part.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Within this context, there is still a need for an improved method for designing a stamping part.

SUMMARY

It is therefore provided a computer-implemented method for designing a stamping part having one or more flanges. The method comprises providing a first boundary representation (B-Rep) model. The first B-Rep model represents the stamping part without the one or more flanges. The first B-Rep model has a 3D boundary curve formed by a set of boundary-curve edges. The method also comprises providing a first value representing a g1-continuity extrapolation length requirement and a second value representing a g2-continuity extrapolation length requirement. The method also comprises determining a second B-Rep model representing the stamping part with extra material to be removed to form an unfolded state of the one or more flanges. The second B-Rep model comprises an extrapolation of the first B-Rep model with extrapolation patches formed along the 3D boundary curve. The second B-Rep model presents at least a g2-continuity over a length of the extrapolation patches equal to the second value and then at least a g1-continuity over a length of the extrapolation patches equal to the first value. The determination of the second B-Rep model includes partitioning the set of boundary-curve edges into first groups each of one or more consecutive first boundary-curve edges, and second groups each of one or more consecutive second boundary-curve edges. The determination of the second B-Rep model also includes applying a surface-extension operator respectively to each first group, thereby obtaining respective first extrapolation patches formed along the 3D boundary curve and separated by respective gaps. The determination of the second B-Rep model also includes filling the gaps, thereby obtaining respective second extrapolation patches connecting the first extrapolation patches together and with the first B-Rep at respective second boundary-curve edges.

The method may comprise one or more of the following:

- the 3D boundary curve comprises one or more concave areas and one or more convex areas, at least one convex area comprising at least one boundary-curve edge of a length higher than a first threshold and lower than a second threshold, the second threshold being higher than the first threshold. Each such convex area comprises a second group;
- given a 2D convex bounding curve of the projection of vertices of the 3D boundary curve onto a 2D plane, each boundary-curve edge belongs to a concave area of the 3D boundary curve if its projection onto the 2D plane is inside the 2D convex bounding curve, otherwise the boundary-curve edge belongs to a convex area of the 3D boundary curve;
- the 2D plane substantially maximizes an area of a projection of the first B-Rep on the plane;
- each first boundary-curve edge further satisfies any one or any combination of a list of criteria for an edge including:
  - a) the edge does not bound a variable fillet face or a joint fillet face,
  - b) the edge does not bound a face having an area below a predetermined threshold,
  - c) the edge does not join an inner edge that presents a parallelism with the boundary curve.
  - d) the edge does not join, at its two bounding vertices, two inner edges that present an intersection within a threshold distance from the 3D boundary curve outside the first B-Rep,
  - e) the edge does not bound a fillet face having a theoretical fillet parallel to the first boundary-curve edge,
  - f) the edge is not in a patch area,
  - g) the edge does not join, at a same bounding vertex, at least two inner edges, and
  - h) the edge is of a length above a predetermined threshold;
- the filling of the gaps comprises applying a surface-connect operator to one or more second groups:
  - consisting of at least one boundary-curve edge that does not satisfy criterion d); and/or
  - consisting of at least one boundary-curve edge that belongs to a convex area of the 3D boundary curve and is of a length higher than the first threshold and lower than the second threshold;

the filling of the gaps comprises applying a fillet-connect operator to one or more second groups each comprising:

a boundary-curve edge bounding a planar face, a first chain of boundary-curve edges adjacent to the boundary-curve edge and respectively bounding first fillet faces, and a second chain of boundary-curve edges adjacent to the boundary edge and respectively bounding second fillet faces, the first fillet faces and second fillet faces being two-by two symmetrical with respect to the planar face and having two-by-two a similar fillet radius, the boundary-curve edge, the first chain of edges and the second set of edges belonging to a same concave or convex area; or a boundary-curve edge that does not satisfy criterion d), a first chain of boundary-curve edges adjacent to the boundary-curve edge and respectively bounding first fillet faces, and a second chain of boundary-curve edges adjacent to the boundary edge and respectively bounding second fillet faces, the first fillet faces and second fillet faces intersecting each other two-by-two and having a similar fillet radius, the boundary-curve edge, the first chain of edges and the second set of edges belonging to a same concave or convex area;

each second extrapolation patch obtained by the application of a fillet-connect operator being formed by several faces each bounded by at least one second boundary-curve edge and at least one edge which is outside the first B-Rep model and joins two vertices of the 3D boundary curve;

the application of the surface-extension operator to each first group is constrained by planes at both extremities of the first group, planes delimiting two-by-two respective second groups are each oriented depending on the geometry of the respective second group and on the type of operator applied to said respective second group; and/or the first value is between 10 mm and 50 mm and the second value is higher than 2 mm and/or lower than 5 mm.

It is further provided a process for manufacturing a stamping part having one or more flanges.

The process comprises performing the method for designing a stamping part having one or more flanges. The process thereby obtains a B-Rep model representing the stamping part with extra material to be removed to form an unfolded state of the one or more flanges.

The process also comprises using the obtained B-Rep model to produce the stamping part with the extra material.

In examples, the process further comprises forming the one or more flanges by removing the extra material, and/or folding the one or more flanges.

It is further provided a computer program comprising instructions for performing the method.

It is further provided a computer readable storage medium having recorded thereon the computer program.

It is further provided a system comprising a processor coupled to a memory, the memory having recorded thereon the computer program.

BRIEF DESCRIPTION OF THE DRAWINGS

Non-limiting examples will now be described in reference to the accompanying drawings, where:

FIGS. 1A, 1B and 1C show an example of a schema of a device used for manufacturing stamping parts and examples of different stamping parts;

DETAILED DESCRIPTION

Figure 2:
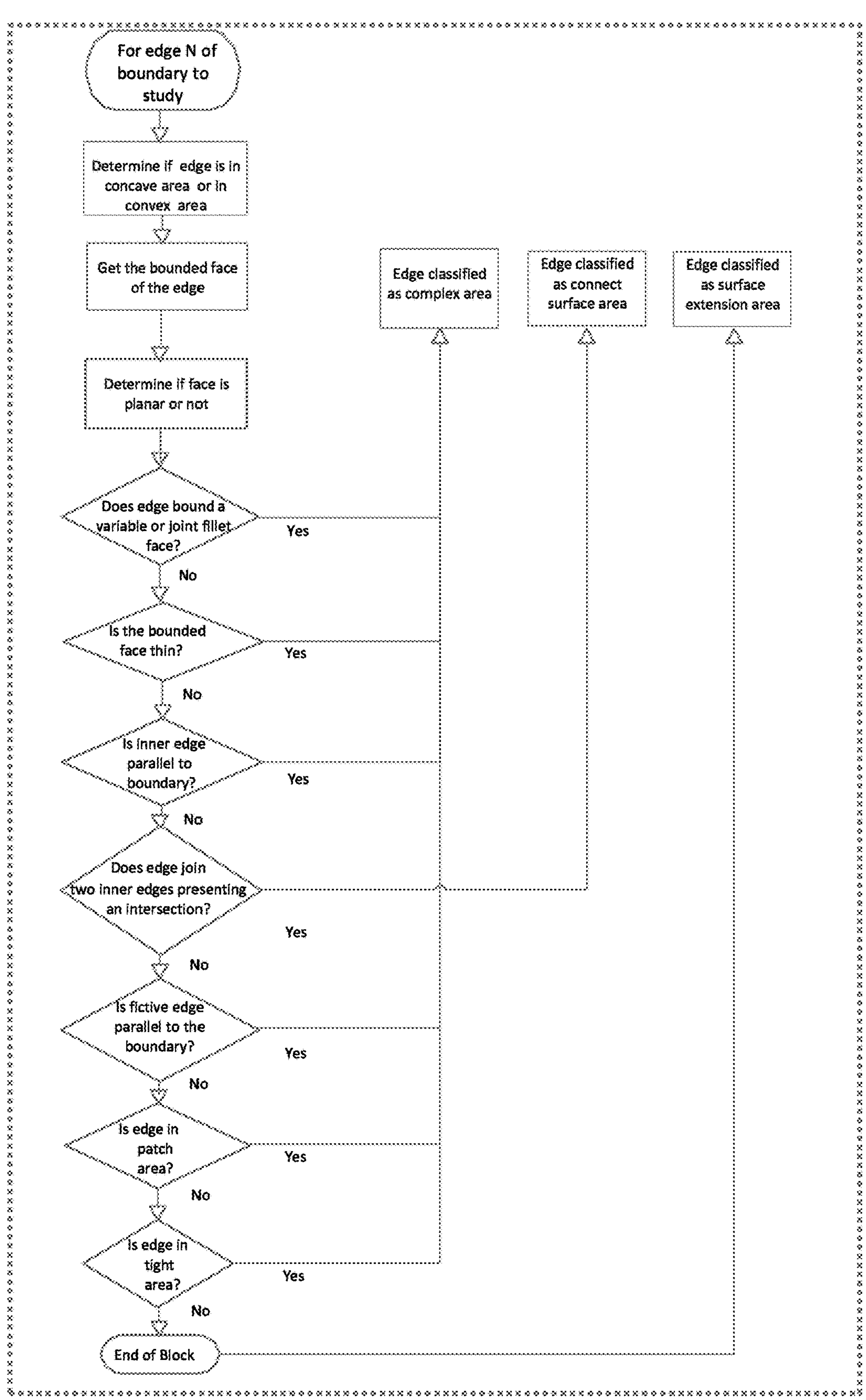
FIGS. 2, 3, 4 and 5 show flowcharts of examples of the method.

Described is a computer-implemented method for designing a stamping part. The stamping part has one or more flanges. A flange is a metal surface sheet that sticks out from the main body stamping part. In other words, the flange corresponds to a portion of the stamping part that is bent after the punch when manufacturing the stamping part. The one or more flanges are folded for obtaining the final stamping part (also possible referred to as "stamped part"). Thus, the one or more flanges comprise visible and invisible portions, that is, portions of the flanges facing the main body of the stamping part, and portions that face the exterior, and are thus visible. The stamping part itself may present a visible external portion of its main body (e.g., the exterior surface of a car hood) and an opposite internal non-visible portion of its main body (e.g., the interior surface of the car hood). The flanges may be folded along the outer boundary of the stamping part main body and towards the internal non-visible portion of the stamping part main body so that the folded flanges globally face the non-visible internal portion of the stamping part main body.

The method comprises providing a first boundary representation (B-Rep) model. The first B-Rep model represents the stamping part without the one or more flanges. That is, the first B-Rep model is a representation of a main body of a stamping part to be manufactured. The first B-Rep model has a 3D boundary curve. The 3D boundary curve is formed by a set of boundary-curve edges. The first B-Rep model is thus an open B-Rep.

The method thus manipulates B-Reps, and B-Rep concepts involved in the method are now discussed.

A B-Rep model includes topological entities and geometrical entities. Topological entities are: face, edge, and vertex. Geometrical entities are 3D objects: surface, plane, curve, line, point. By definition, a face is a bounded portion of a surface, named the supporting surface. An edge is a bounded portion of a curve, named the supporting curve. A vertex is a point in 3D space. They are related to each other as follows. The bounded portion of a curve is defined by two points (the vertices) lying on the curve. The bounded portion of a surface is defined by its boundary, this boundary being a set of edges lying on the surface. Edges of the face's boundary are connected together by sharing vertices. Faces are connected together by sharing edges. By definition, two faces are adjacent if they share an edge. Similarly, two edges are adjacent if they share a vertex.

An inner edge of a B-Rep is shared by exactly two faces. The faces sharing the edge are said to be incident to each other, or incident to the shared (or common) edge. A boundary edge is not shared, it bounds only one face. A boundary face is incident to at least one boundary edge. A B-Rep is said to be closed if all its edges are inner edges. A B-Rep is said to be open (or an "open skin") if it includes boundary edges.

The method also comprises providing a first value representing a g1-continuity extrapolation length requirement. The first value is in other words a required extrapolation length for extrapolating the first B-rep so that the extrapolation presents a g1 continuity (i.e., is tangent continuous or differentiable) along this length. Additionally, the method comprises providing a second value representing a g2-continuity extrapolation length requirement. The second value is in other words a required extrapolation length for extrapolating the first B-rep so that the extrapolation presents a g2 continuity (i.e., is curvature continuous) along this length. The concepts of g1 and g2 continuity are well known for the field of manufacturing CAD (i.e., software solutions for designing and/or manufacturing manufacturable products). By "length", it is meant a physical length (e.g., millimeters or centimeters) over which the (g1 or g2) continuity extrapolation length requirement is to be satisfied. The first value and/or the second value may be predetermined, provided by a user, or determined automatically by the method (in which case the method may comprise a step of automatically determining the first value and/or the second value), for example as a function of the dimensions of the stamping part. The first and second value represent requirements for the design and manufacturing of the flange(s) of the stamping part. Indeed, the g2 continuity requirement amounts to requiring that each flange is g2 continuous near the boundary of the part main body and along the length corresponding the second value, which allows the folding (e.g., without breaking) of the flange when manufacturing the part. The g1 continuity requirement amounts to requiring that the flange is then g1 continuous on its portion which faces the main body when the flange is folded and allows a high quality of the flange.

The method also comprises determining a second B-Rep model. The second B-Rep model represents the stamping part with extra material to be removed to form an unfolded state of the one or more flanges. By "unfolded state", it is meant that the flanges are spread out from the main body of the stamping part (represented by the first-B-Rep model), and thus it corresponds to the stamping part in a state before folding the flanges, but for example after cutting of extra material. In other words, the second B-Rep model extrapolates the representation of the first B-Rep model with parametric surfaces representing the one or more unfolded flanges.

The second B-Rep model comprises an extrapolation of the first B-Rep model with extrapolation patches formed along the 3D boundary curve. An extrapolation patch comprises one or more faces extending along a portion of the supporting face of an existing boundary-curve edge. Thus, at least one edge of a face of the extrapolation patch shares a common edge with an edge of the 3D boundary curve. In other words, the extrapolation patch may comprise at least one face being bounded by at least one edge of the 3D boundary curve.

The second B-Rep model presents at least a g2-continuity over a length of the extrapolation patches equal to the second value and then (that is, over a length consecutive, or adjacent to the length of the second value) at least a g1-continuity over a length of the extrapolation patches equal to the first value. By "over a length" it is meant that the extrapolation patches comprise one or more faces satisfying the (g1 or g2) continuity requirement over the physical length. G2-continuity is a known continuity constraint required for folding flanges in a stamping process. G1-continuity is another known continuity constraint that may be required in parts of the flanges that are invisible. In examples, the method may define the length according to a standard frame of reference.

The determination of the second B-Rep model includes partitioning (e.g., automatically) the set of boundary-curve edges into different groups of boundary-curve edges, that is, identifying a partition of different groups of boundary-curve edges. The groups form a partition of the set of boundary-curve edges, and thus do not overlap and altogether cover the whole set. In other words, each boundary-curve edge of the boundary curve belongs to one and only one group resulting from the partitioning. The partition consists of first groups and second groups.

Each first group is a group of one or more consecutive first boundary-curve edges. Each second group is a group of one or more consecutive second boundary-curve edges. By "consecutive", it is meant that each first boundary-curve edge of a given (first or second) group are adjacent one to another, that is, a given boundary-curve edge shares one vertex with another first boundary-curve edge of the same given group. Thus, two first boundary-curve edges, each belonging to a different (first or second) group, do not share any vertex. In other words, for each given group, there exists a unique path linking all first boundary edges within said group.

The method also comprises applying (e.g., automatically) a surface-extension operator respectively to each first group. The surface-extension operator is, as known, an operator that takes as input a surface and a portion of its boundary, and outputs an extrapolation of the surface across/at/along said portion of the boundary. In the present case, the surface-extension operator is applied taking as input the first B-Rep and a respective first group, and the application of the surface-extension operator allows to obtain as output a respective first extrapolation patch formed along the respective first group. By "first extrapolation patches" it is thus meant that the patches are all patches extrapolated from first groups of continuous edges via the surface-extension operator. The first extrapolation patches are separated by respective gaps. This means that the surface-extension operator is not applied at boundary edges belonging to a second group.

The method also comprises (e.g., automatically and subsequently to the application of the surface-extension operator) filling the gaps. By "filling" it is meant creating, for each gap (e.g., automatically for all the gaps or for one or more of them), a parametric surface delimited by an area covered on each corresponding gap. Thus, the method obtains respective second extrapolation patches connecting the first extrapolation patches together and with the first B-Rep at respective second boundary-curve edges. The filling thus amounts to stitching the first extrapolation patches two-by-two and with the first B-Rep, thereby completing the determination of the second B-Rep, and thus providing an extrapolation of the first B-Rep all around first B-Rep (i.e., along the whole 3D boundary curve).

Such a method improves the design of a stamping part having one or more flanges. Indeed, the resulting unfolded flanges of the stamping part may be folded while maintaining roundness in the folds, and thus being of high quality, e.g., folding the flange does not damage the main body of the stamping part. As the B-Rep model presents at least a g2-continuity over a length of the extrapolation patches (formed along the 3D boundary curve) equal to the second value, the zone of the extrapolation patches presenting the g2-continuity is close to a physical zone of the boundary of the stamping part main body where the flanges are folded in the manufacturing. The folding is of high quality, thanks to the fact that the folding is kept rounded, thanks to g2-continuity. This is because g2-continuity allows for a smooth transition (that is, without degeneracies, e.g., twists, breaks or sharp corners) between the stamping part (modeled by the first B-Rep model) and the one or more flanges. Moreover, as the extrapolation patches present, over a length consecutive to the length satisfying the g2-continuity requirement, a g1-continuity over a length of the extrapolation patches equal to the first value, the flange maintains a high manufacturing quality of the folded (and invisible) flange.

Besides allowing the high quality design of a stamping part with its flange(s) in the unfolded state, the method also allows the design of a corresponding stamping machine, as the geometry of the stamping part in the unfolded state allows inference of the required geometry of the stamping machine for manufacturing the stamping part.

Compared to the other methods of extrapolation, the method obtains an improved solution of extrapolation at the right place of the 3D surface, thanks to the partition of the 3D boundary curve into the first and second extrapolation patches.

Moreover, the method improves the creation of flanges on complex geometries. The method indeed partitioned the boundary of the first B-rep into groups, which objectively provides the zones (i.e., the first groups) where a surface-extension operator is to be applied. This improves efficiency and quality of the design of the flanges, as the flanges may be thereby objectively created in the proper places. The partitioning and the application of the surface-extension operator may be automatic, thereby allowing for a high quality design of the flange with a reduced amount of user interactions. Thus, the method improves productivity compared to manually defining the flanges in the unfolded state. Therefore, the method improves the efficiency of the design while ensuring a high quality of the flanges.

The method may be included in a process for manufacturing a stamping part having one or more flanges, which comprises performing the method for designing the stamping part. In other words, the process comprises providing a first B-Rep model representing the stamping part without the one or more flanges, providing a first value representing a g1-continuity extrapolation length requirement and a second value representing a g2-continuity extrapolation length requirement, and determining a second B-Rep model according to the method. The process thereby obtains a B-Rep model (i.e., the determined second B-Rep) representing a the stamping part with extra material to be removed to form an unfolded state of the one or more flanges. The process also comprises using the obtained B-rep model for producing a physical product corresponding to the modeled object, i.e., said stamping part with the extra material. Because the method improves the design of the stamping part, the method also improves the manufacturing of the stamping part and thus increases productivity of the stamping process.

In examples, the process may further comprise forming the one or more flanges by removing the extra material (e.g., cutting it from the main body except on portions where the flanges are located), and/or folding the one or more flanges.

FIG. 1A shows an illustration of an example of a device 100 used for manufacturing stamping parts, and which may be used for producing a stamping part according to the process. The device 100 comprises an upper die shoe 110, a lower die shoe 120 and a punch 130. The shape of the punch 130 corresponds to the shape of the stamping part, that is, including the shape of the main body and including the extra material and/or the one or more flanges. A material such as a metal sheet 140 may be placed between the die shoes and may then be pressed against the punch. Since the shape the punch corresponds to the shape of the manufacturing part, as the metal sheet is pressed against it, it follows the intended manufacturing shape. The method may use the obtained B-rep model to design the shape of the punch, to obtain the stamping part with extra material to be removed to form an unfolded state of the one or more flanges by pressing the metal sheet against the punch. FIGS. 1B and 1C show different examples of stamping parts that may be manufactured according to the process.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's design intent. In examples, this level may be user-defined and/or pre-defined.

A typical example of computer-implementation of a method is to perform the method with a system adapted for this purpose. The system may comprise a processor coupled to a memory, the memory having recorded thereon a computer program comprising instructions for performing the method. The memory is any hardware adapted for such storage, possibly comprising several physical distinct parts, e.g., one for the program.

In examples, the 3D boundary curve comprises one or more concave areas and one or more convex areas. At least one convex area (of the one or more concave areas) comprises at least one boundary-curve edge of a length higher than a first threshold and lower than a second threshold. The second threshold is higher than the first threshold. The first threshold may be a predetermined distance, e.g., between 1 mm and 5 mm, for example 2 mm. The second threshold may be a predetermined distance, e.g., between 10 mm and 100 mm, for example 50 mm. The method uses distances (which may be provided in, e.g., metric units, imperial units), and may perform any kind of conversions to adapt these to the 3D dimensions of the first B-Rep model of the stamping part, e.g., by taking into account the specifications of the dimensions the stamping part in a CAD system or by referring to a reference axis system. Each such convex area comprises a second group of boundary-curve edges. Thus, the method allows to separate (e.g., adjacent or separated by gaps) first groups, such that the first groups are not too large (with respect to the dimensions of the 3D boundary curve). This allows to obtain improved results of the application of the surface-extension operator. Indeed, the 3D boundary curve may be split the application of surface extension operator via the first and second groups. That is, the application of the surface-extension operator is constrained with respect to the partition of the first and second groups thereby yielding to regular flanges. In addition, thanks to the convex area comprising at least one boundary-curve edge of the length higher than the first threshold and lower than the second threshold (higher than the first threshold), the method ensures that the surface extension operator is not applied to "too large" areas (that is, to edges larger than the length between the first and second thresholds) and do not encompass a whole concave-convex-concave inversion, so that the application yields better results.

In examples, given a 2D convex bounding curve of the projection of vertices of the 3D boundary curve onto a 2D plane, each boundary-curve edge belongs to a concave area of the 3D boundary curve if its projection onto the 2D plane is inside the 2D convex bounding curve. Otherwise the boundary-curve edge belongs to a convex area of the 3D boundary curve.

In examples, the 2D plane substantially maximizes an area of a projection of the first B-Rep on the plane. By "substantially" it is meant that, the 2D plane may cover (or enclose) at least an area of the projection of the first B-Rep above a predetermined threshold. For example, the predetermined threshold may be that at least 50% of the total area of the projection of the first B-Rep model is covered by the 2D plane. The method may automatically find 2D planes that maximizes the area of the projection. This allows to obtain automatically the largest possible projection of the 3D boundary curve.

Further examples of the method are now discussed.

Some examples of the method correspond to an implementation algorithm for implementing the partitioning step, and this algorithm may be referred to as "Boundary Analysis".

The method may take as input an axis system, a 3D boundary curve and a 3D Surface model representing the main body of the stamping part (that is, the first B-Rep model). Alternatively, the axis system may also be automatically determined.

Figure 6:
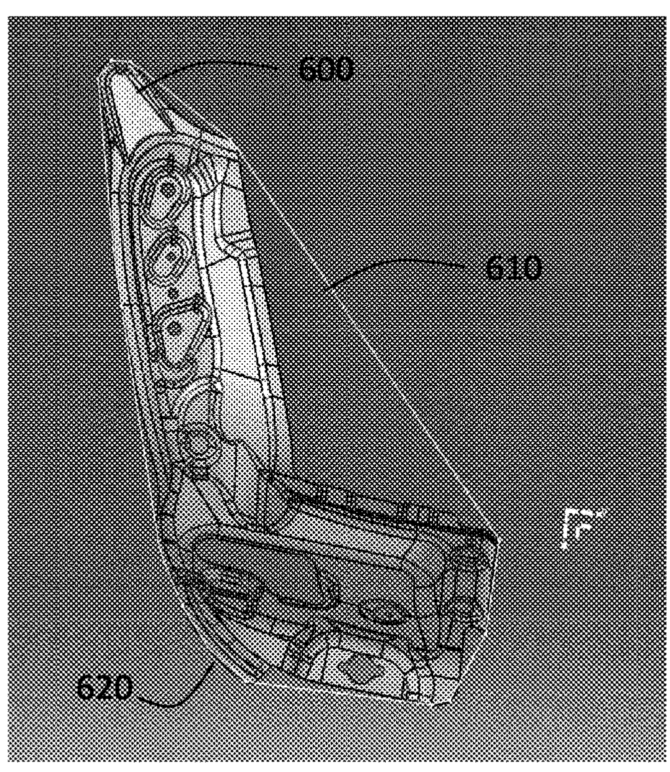
FIGS. 6, 7, 8, 9, 10, 11, 12, 13A, 13B, 14, 15, 16, 17, 18 and 19 illustrate examples of partitioning a set of boundary-curve edges by the method.

With reference to FIG. 6, the method may start by computing a 2D convex bounding curve 610 of the projection of the 3D boundary curve 600 in a plane normal to the z-coordinate of axis system of the model. When the method computes a 2D convex bounding curve, the output curve may be convex and may be offset compared to the 3D Bounding Curve 620. The method may use an offset value of 0 for this 2D convex bounding curve.

The method may use a 0-distance so that the 2D convex bounding curve intersects with the boundary-curve edges of the 3D projected boundary curve. This intersection determines changes of concavity and/or convexity with respect to the 2D convex bounding curve. This data may be used in subsequent steps (for example: if a boundary-curve edge of the 3D boundary curve is in the classification Surface Extension segment, and its neighbor boundary-curve edge is also in the same classification but on another area of concavity, the method skips the boundary-curve edge).

Now, the method may obtain a list of edges by concave or convex areas. The method performs a check on a list of edges from the 3D boundary curve in a chained way, i.e., iterating through the edges as found on the 3D boundary curve. For example, the method may iterate through three edges forming a closed boundary as Edge 1→Edge 2→Edge 3→Edge 1, where each of edges 1, 2 and 3 form the closed boundary.

In examples, each first boundary-curve edge further may satisfy any one or any combination of a list of criteria. That is, in addition to the boundary-curve edge belonging to a concave or convex area of the 3D boundary curve, each edge may satisfy any criterion from the list of criteria, or any combination (e.g., all) thereof. The list of criteria includes:

a) the edge does not bound a variable fillet face or a joint fillet face,
b) the edge does not bound a face having an area below a predetermined threshold,
c) the edge does not join an inner edge that presents a parallelism with the boundary curve.
d) the edge does not join, at its two bounding vertices, two inner edges that present an intersection within a threshold distance from the 3D boundary curve outside the first B-Rep (e.g., an edge not satisfying criterion d) and/or its bounding face may be referred to as an intersecting area, on which a "connect surface" operator may be applied),
e) the edge does not bound a fillet face having a theoretical fillet parallel to the first boundary-curve edge,
f) the edge is not in a patch area,
g) the edge does not join, at a same bounding vertex, at least two inner edges (e.g., an edge not verifying criterion g) may be referred to as "tight area"), and
h) the edge is of a length above a predetermined threshold.

In examples, the filling of the gaps comprises applying a surface-connect operator to one or more second groups. Each such second group may consist of at least one boundary-curve edge that may not satisfy criterion d). Alternatively or additionally, said each such group may consist of at least one boundary-curve edge that belongs to a convex area of the 3D boundary curve. Said at least one boundary-curve edge may be of a length higher than the first threshold (e.g., higher than 2 mm) and lower than the second threshold (e.g., lower than 50 mm). The method thus simplifies the application of the surface-extension operator, as the application is more computationally efficient, and with an improved quality for generating the flanges.

Further examples of the method are now discussed.

Referring to FIG. 2, the method may iterate through the boundary-curve edges. The method may retrieve (or get, obtain) a face bounded by the edge. The method may identify if the boundary curve edges satisfy corresponding to the current iteration and classify the edges to either apply the surface-extension operator or filling a corresponding gap. The method may iterate through the edges in the check list below. FIG. 2 shows that each criterion is chained through a binary condition. The method may classify the edge corresponding to the iteration and continue to the next edge if a determination is positive:

- Determine if the 3D boundary curve comprises one or more concave areas and one or more convex areas,
- Determine if a boundary-curve edge bounds a planar face,
- Determine if the edge does not bound a variable fillet face or a joint fillet face,
- Determine if the edge does not bound a face having an area below a predetermined threshold,
- Determine if the edge does not join an inner edge that presents a parallelism with the boundary curve,
- Determine if the edge does not join, at its two bounding vertices, two inner edges that present an intersection within a threshold distance from the 3D boundary curve outside the first B-Rep,
- Determine if the edge does not bound a fillet face having a theoretical fillet parallel to the first boundary-curve edge,
- Determine if the edge is not in a patch area,
- Determine if the edge does not join, at a same bounding vertex, at least two inner edges.

Figure 3:
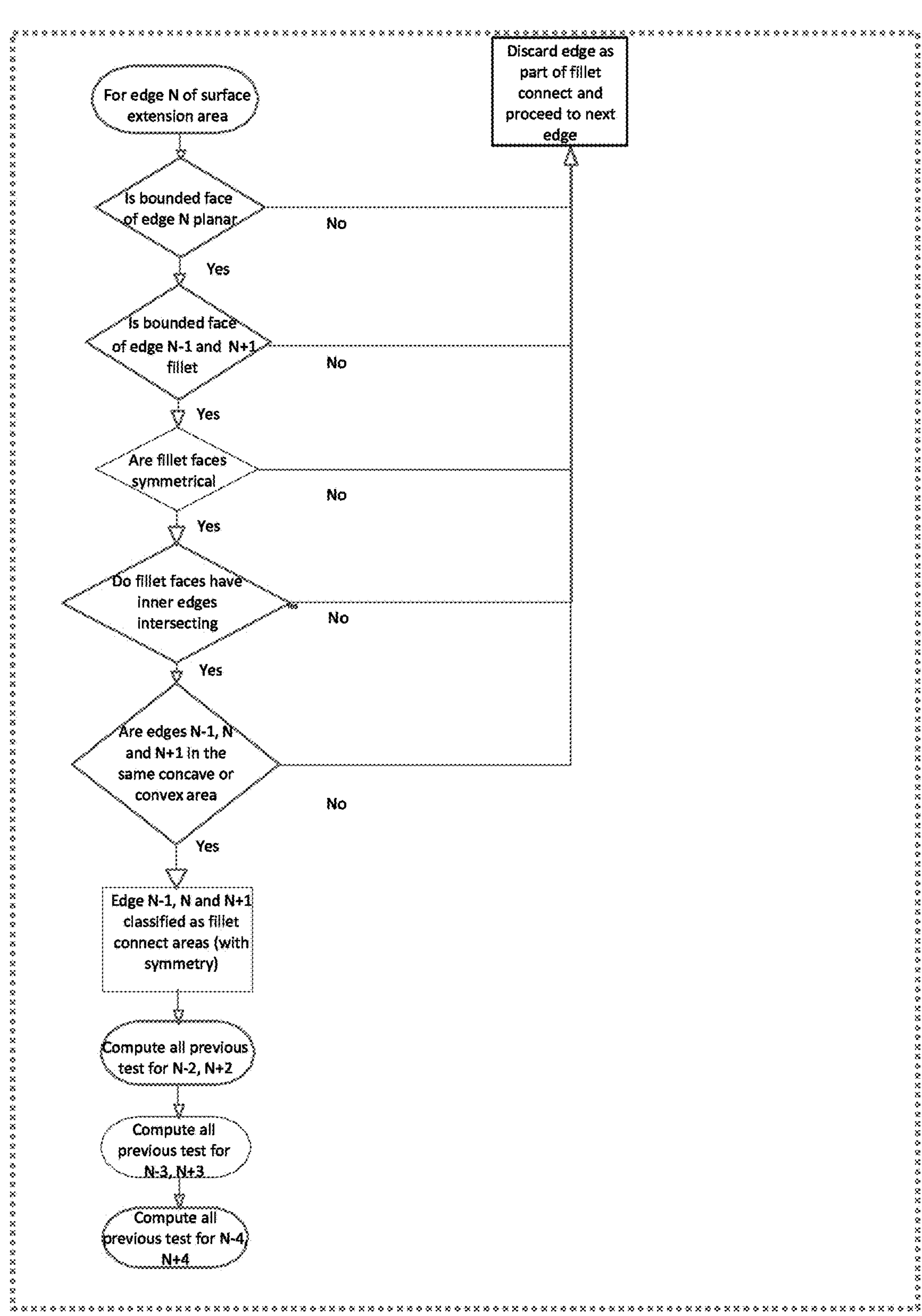
Figure 4:
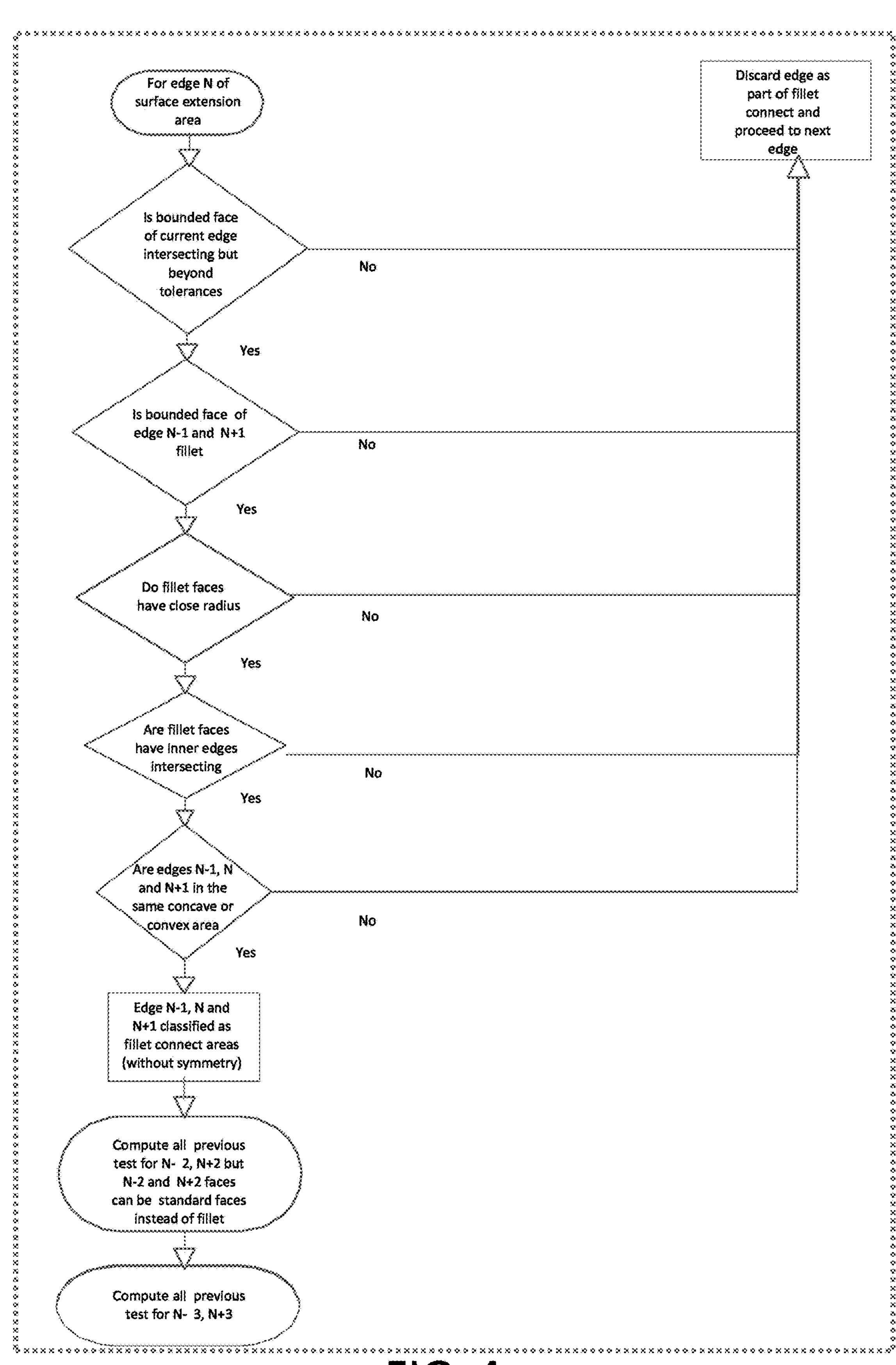
Figure 5:
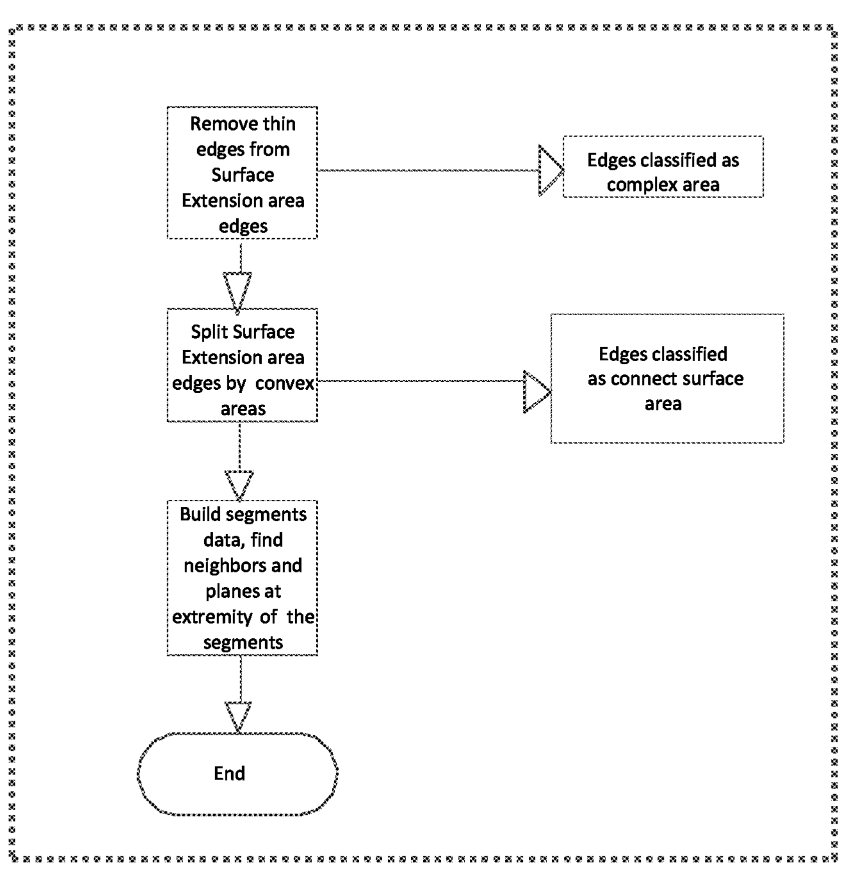

The method may also determine a list of so called global criteria. These global criteria (which will be detailed later) may be:

- Determine fillet areas that can be connected together. FIGS. 3 and 4 show flowcharts illustrating the determination of fillet areas that can be connected together. FIG. 3 shows a flowchart illustrating the determination of symmetric fillet-connect areas. FIG. 4 shows a flowchart illustrating the determination of intersecting fillet-connect areas;

Determine thin edges, from the edges that do not satisfy condition h);

Split the convex areas of the 3D boundary curve. FIG. 5 shows a flowchart exemplifying the split of the 3D boundary curve;

Compute planes at the extremity of the segments.

Figure 7:
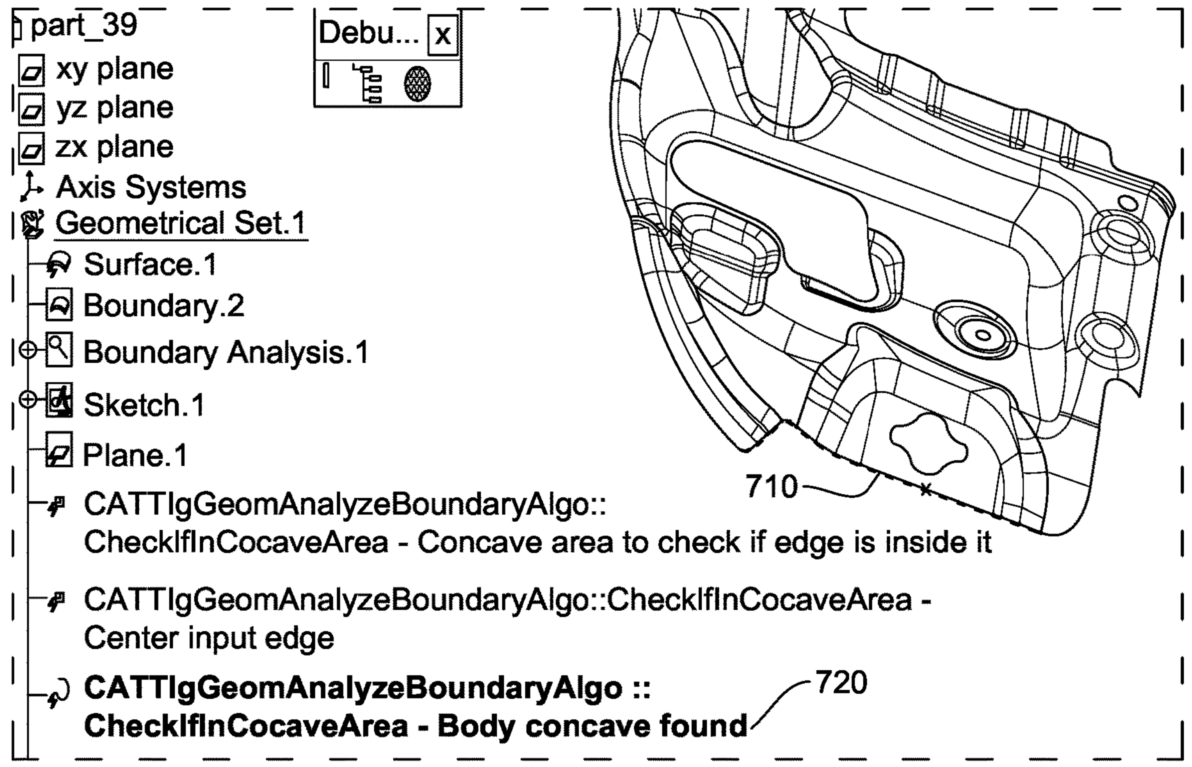

An implementation of the determination of whether the 3D boundary curve comprises one or more concave areas and one or more convex areas is now discussed:

The method may use the center of the edge (which is a point with 3D coordinates) to check if an edge belongs to a concave area. The method may iterate on edges along the concave or convex areas, that is, on the boundary-curve edges belonging to a concave area or convex area of the 3D boundary curve. FIG. 7 shows an example retrieving a concave area 710. The method may store corresponding data that the edge belongs to a concave area and may store the corresponding area (which may comprise multiple edges). The data may be stored in a list 720.

Figure 8:
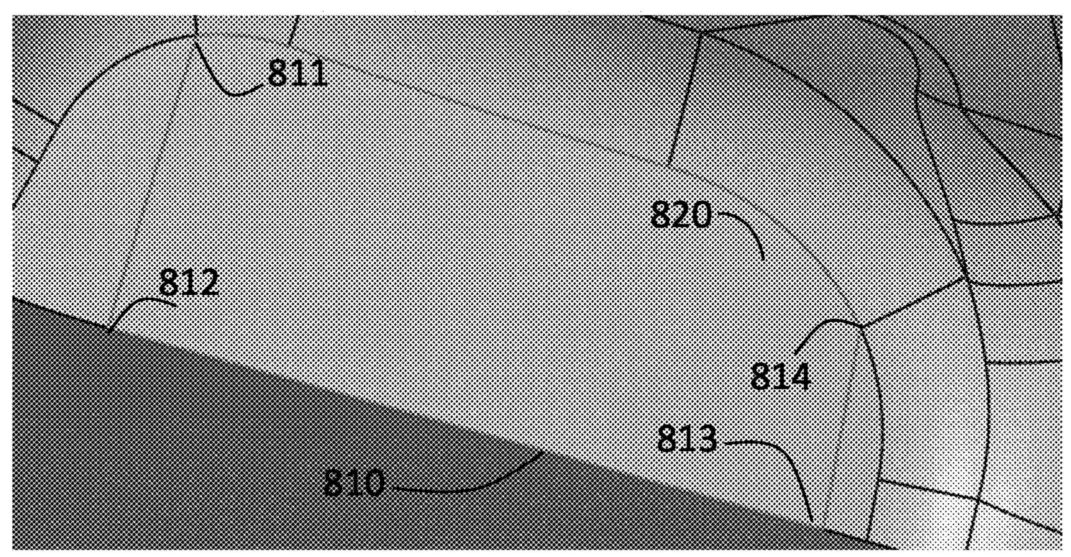

An implementation of the determination if a boundary-curve edge bounds a planar is now discussed, with reference to FIG. 8.

For each edge 810, the method may retrieve its bounding face 820. The bounding face may have multiple vertices (811-814). The method may determine that the face is a flat area if the intrinsic definition of the face is a plane. The method may store the pair edge/flat face. The method may use the vertices to determine the flatness of the face if its intrinsic definition is not a plane. The method may compute a normal direction to the face 820 at each of the vertices (811-814) and a normal direction at the center of the face 820. If all normal directions are the same within a specific threshold from the center of the face, e.g., within an angle of 5 degrees or less, for example 2 degrees, the method may store the pair edge/face as a flat area.

Figure 9:
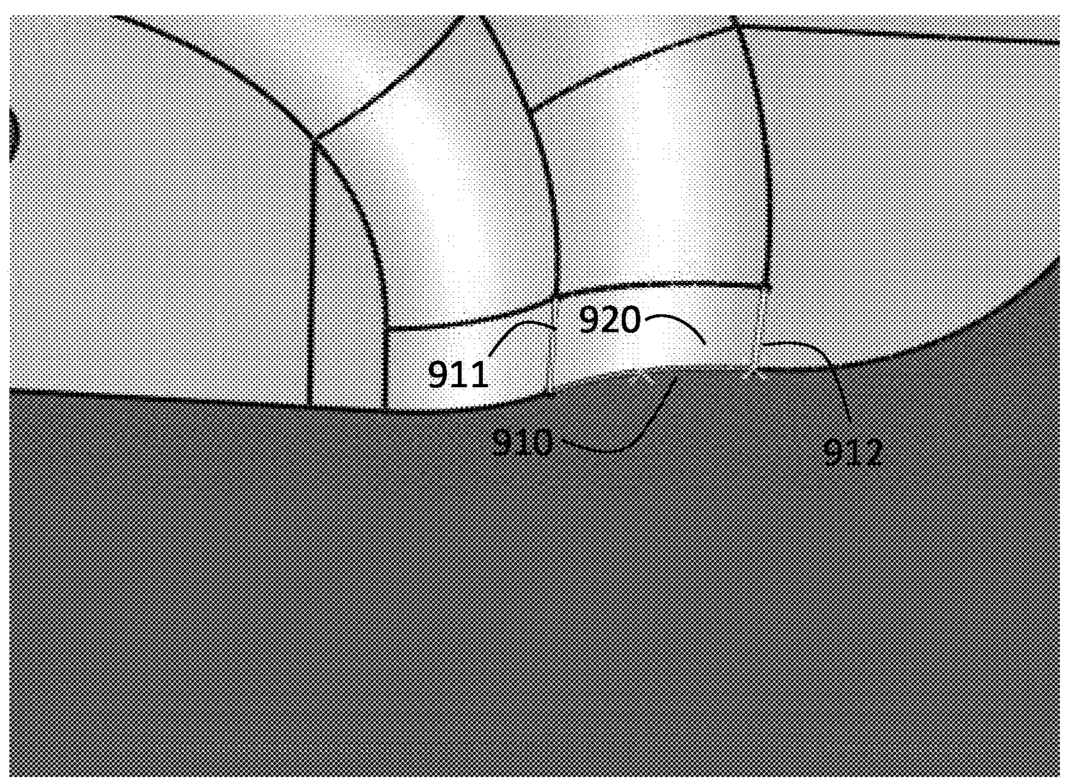

An implementation of the determination the edge does not bound a variable fillet face or a joint fillet face, with reference to FIG. 9.

For each edge 910, the method may retrieve its bounding face 920.

As known in the field of CAD, a fillet face may be a face which is generated from rolling a ball on it, the ball is being rolled tangentially between two adjacent faces to the edge to be filleted. By doing this, the fillet creation is disrupted if the ball reaches the limits of the adjacent faces prior to reaching the edge extremity. This happens especially when the shape around the edge to be filleted shows acute angles. Referring back to FIG. 9, the method determines that the face 920 is a fillet face, and method may store the pair comprising the edge 910 and fillet face 920. The method may also define the type of fillet: constant, variable or joint fillet. For example, joined boundary-curve edges corresponding to joint fillet faces may be automatically included in segment typed complex boundary. The classification may be performed in this manner because of the complexity to extrapolate this kind of joint fillet face.

Figure 10:
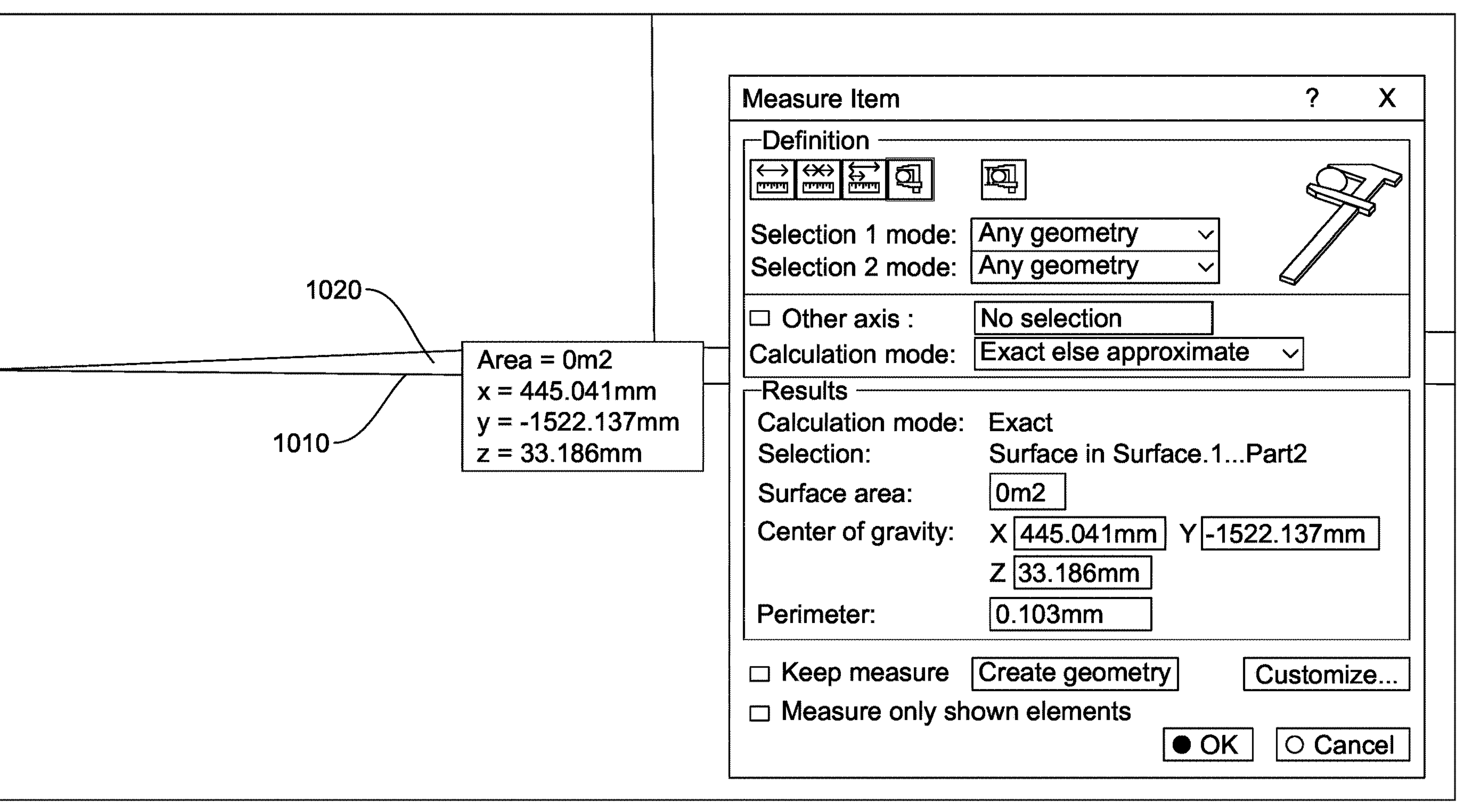

An implementation of the determination if the edge does not bound a face having an area below a predetermined threshold (that is, the edge corresponds to a thin face) is now discussed, with reference to FIG. 10.

The method may retrieve the bounding face of a boundary-curve edge to be checked. If the area of the bounding face is below a specific threshold, below 0.05 $mm^2$, for example 0.01 $mm^2$, the face is automatically deduced as a thin face. The method may automatically include the boundary-curve edge as a segment typed complex boundary. Thus, the method avoids creating degenerate extrapolations caused by the thin face. FIG. 10 shows a screenshot illustrating a boundary-curve edge 1010 and a corresponding bounding face 1020, classified as a thin face.

An implementation of the determination if the edge does not join an inner edge that presents a parallelism with the boundary curve now discussed.

Figure 11:
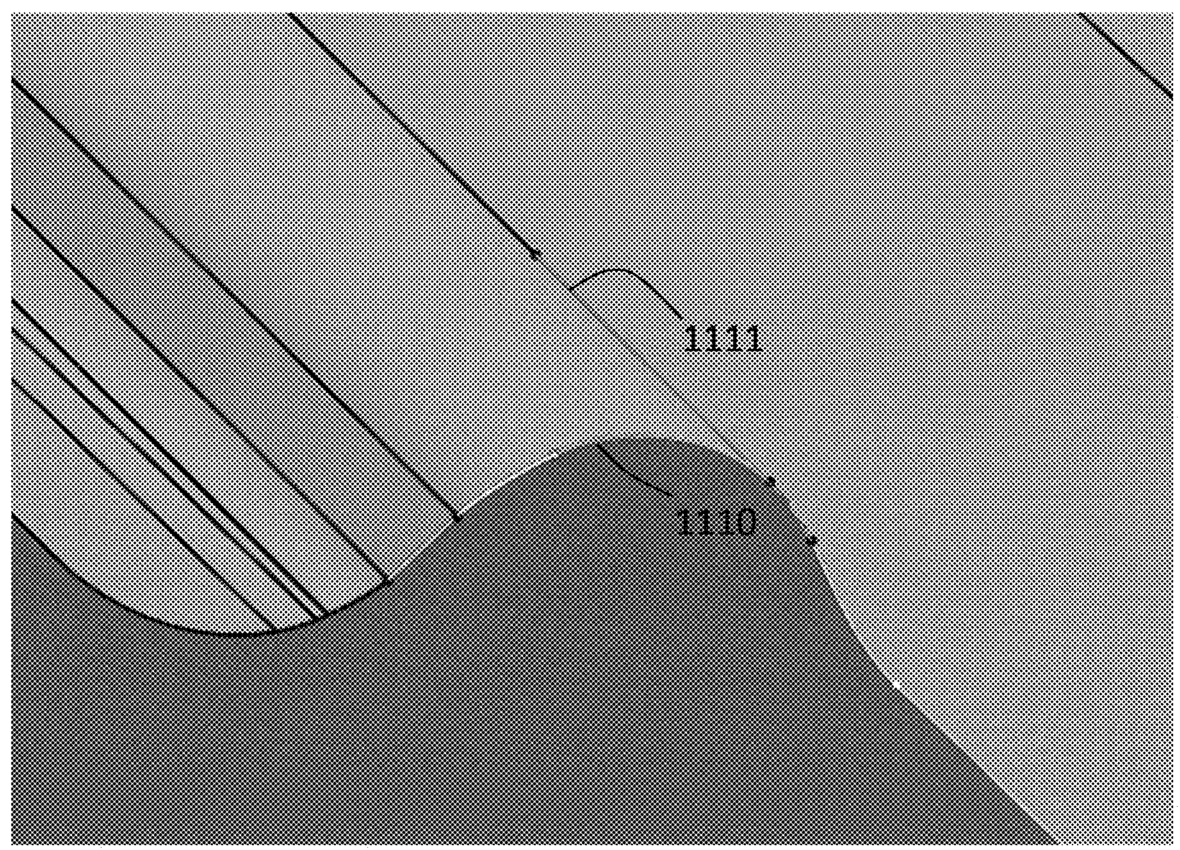

For a given boundary-curve edge, the method may retrieve an inner edge adjacent to this boundary-curve edge. Reference is made to FIG. 11. FIG. 11 shows a boundary-curve edge 1110 and an inner edge 1111 adjacent to the boundary-curve edge 1110. If the inner edge is locally parallel to the edge of the 3D boundary curve, as in the case of the boundary-curve edge 1110 and the inner edge 1111, the method may store data of said parallelism. The method does not extrapolate said boundary-curve edge. The method may include the boundary-curve edges as a complex boundary segment.

An implementation of the determination of intersecting areas, that is, the boundary-curve edge does not join, at its two bounding vertices, two inner edges that present an intersection within a threshold distance from the 3D boundary curve outside the first B-Rep, is now discussed.

For a boundary-curve edge bounding a specific face, the method may retrieve the face.

Figure 12:
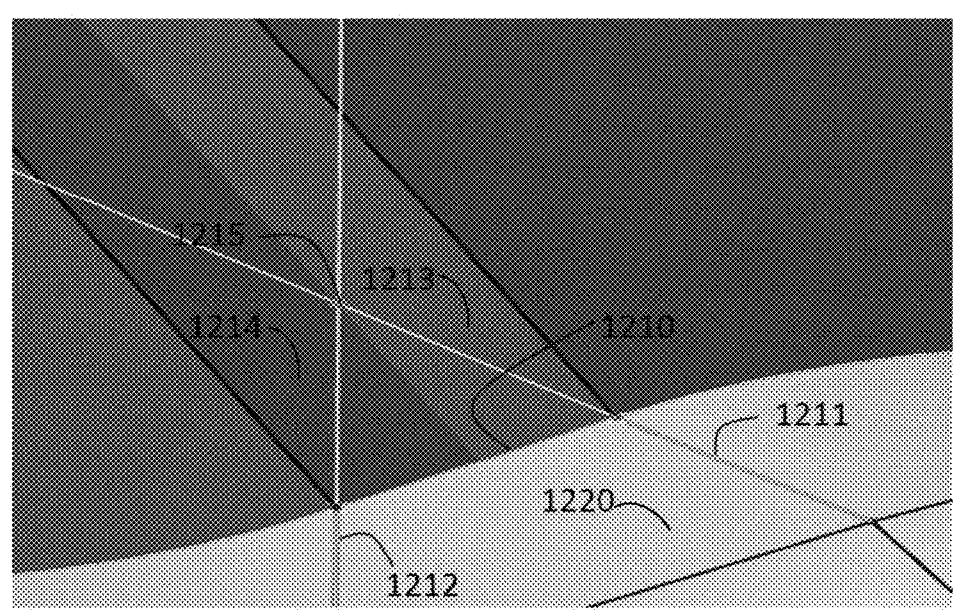

Reference is made to FIG. 12. The method may retrieve the inner edges of the face. For example, the method may retrieve, for a boundary-curve edge 1210, a face 1220. The method may compute tangents 1211, 1212, to the two inner edges oriented to the outside of the 3D surface model. With these tangents 1211, 1212, the method may compute semi-infinite lines. The method may compute, using these infinite lines, extrude surfaces 1213, 1214 with a direction normal to the 3D surface model. Then, the method may intersect the two extrude surfaces 1213 and 1214. The intersection of the two extrude surfaces yields a line. The line may be intersected with one of the semi-infinite lines computed from the tangents 1211, 1212. The intersection may yield a point 1215. To compute the normal, the method may intersect each semi-infinite line with each corresponding inner edge. With the point 1215 resulting from said intersection, the method may compute a minimum distance between the point and the boundary-curve edges of the face 1220. If the distance is below a threshold, e.g., below 12 mm or 10 mm, the face is defined as intersecting area. The method may include intersecting areas as a Connect Surface segment.

An implementation of the determination if edge is parallel to a theorical edge of a fillet, if the edge is corresponding to a fillet, is now discussed.

For a boundary-curve edge bounding a specific face, the method may retrieve the face.

Figures 13A, 13B:
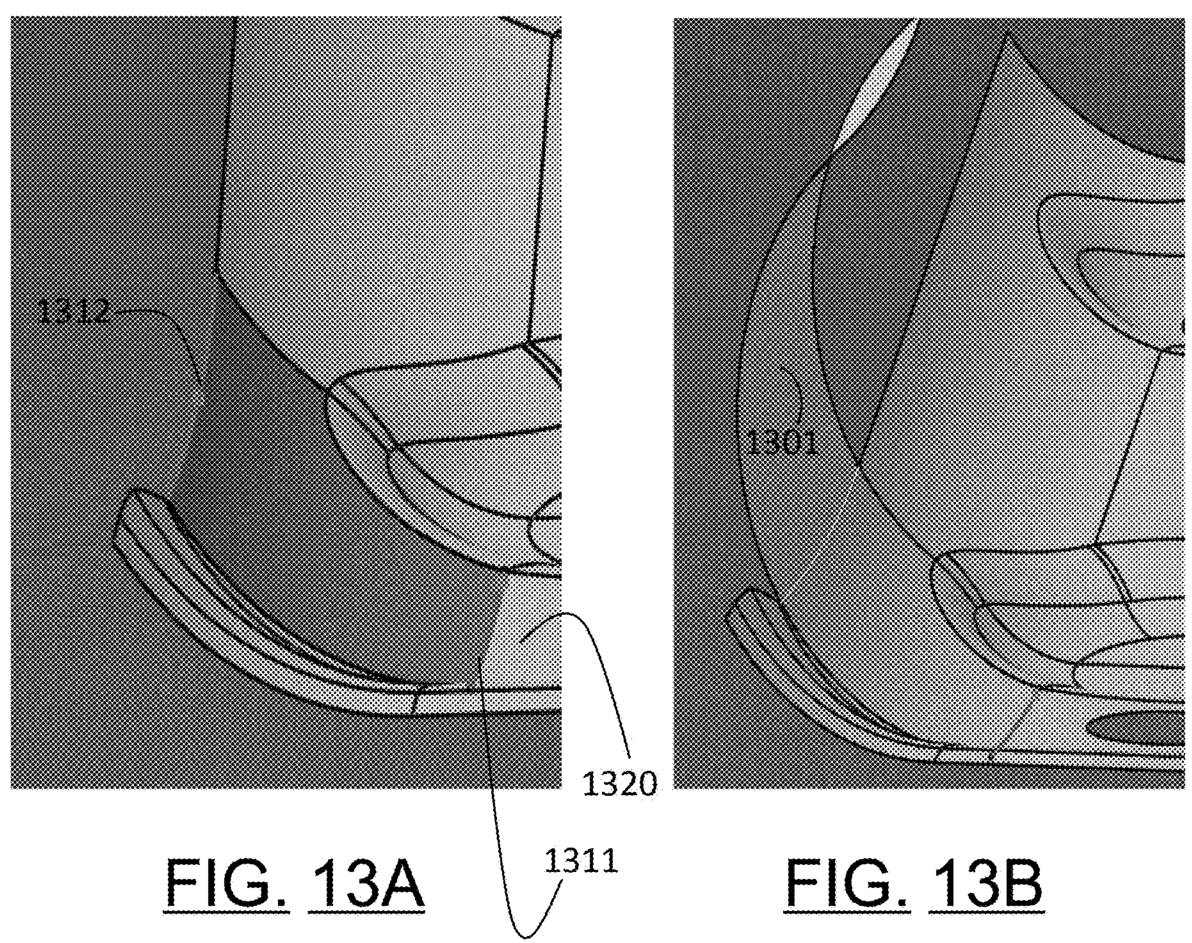

If the face corresponds to a fillet, the method may retrieve the edges. Reference is made to FIGS. 13A and 13B. The method may retrieve the edges 1311 and 1312. A theoretical edge (or a sharp edge before the fillet) is an edge at the middle between the two edges 1311 and 1312. The method may compute a tangent on the 3D boundary curve at a middle point of the edge 1311 and a tangent at a middle point of the edge 1312. The method determines that the area between the two angles is a horizontal fillet area if the angle between the two tangents is substantially close to 180 degrees. By "substantially close" it is meant that the angle between the two tangents may vary from 180 degrees up to a predetermined threshold, e.g., the method may allow a variation of for example 30 degrees around 180 degrees (by around, it is meant that the angle between the two tangents may be any angle between 150 degrees and 210 degrees). This type of area may be included in complex boundary segment. FIG. 13B shows the effect of extrapolating such area. If the area is extrapolated, the extrapolation may create a cylindrical surface 1301, which is not useful for the user. Thus, the method avoids extrapolating the cylindrical surface 1301.

An implementation of the determination if edge is in a patch area is now discussed.

For a boundary-curve edge bounding a specific face, the method may retrieve the face.

Figure 14:
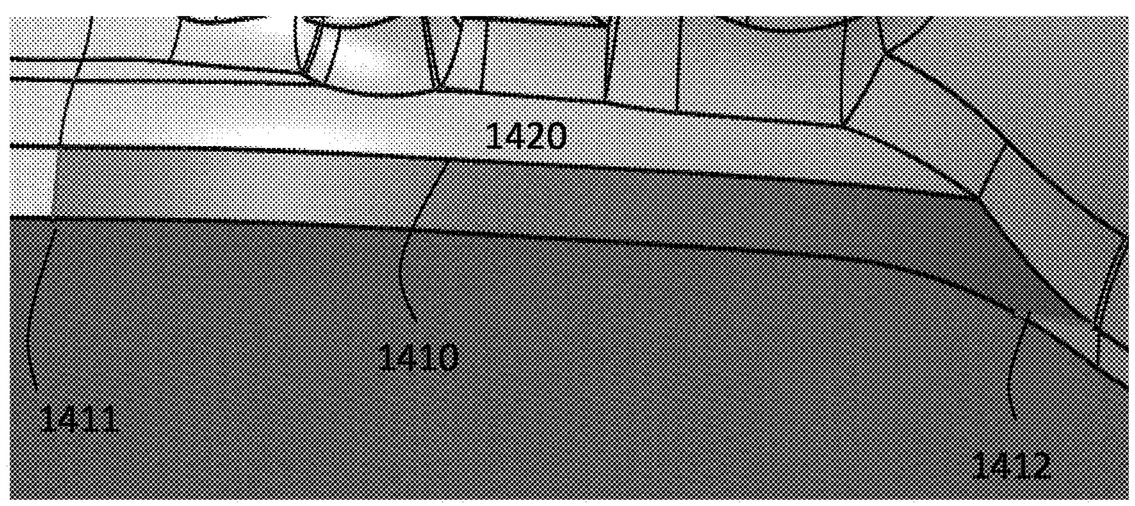

The method may retrieve inner edges of the face, and search for tangents to the inner edges. Reference is made to FIG. 14. The method may compute a tangent at the point between the 3D boundary curve and the inner edges 1411, 1412 at each side of the face 1420. The method may then compute the angle between the two tangents. If the angle is substantially close to 90 degrees (i.e., allowing a variability around 90 degrees up to a predetermined threshold, e.g., 30 degrees), the method determines that the face 1420 is a patch face. The difference between this patch area criterion and the intersecting criterion is that the distance between the intersection and the 3D boundary curve is not taken into account. The method may include the face determined to be a patch area as a complex boundary segment.

An implementation of the determination if the edge does not join, at a same bounding vertex, at least two inner edges (that is, if the edge is not in a so-called tight area is now discussed.

For a boundary-curve edge bounding a specific face, the method may retrieve the face.

Figure 15:
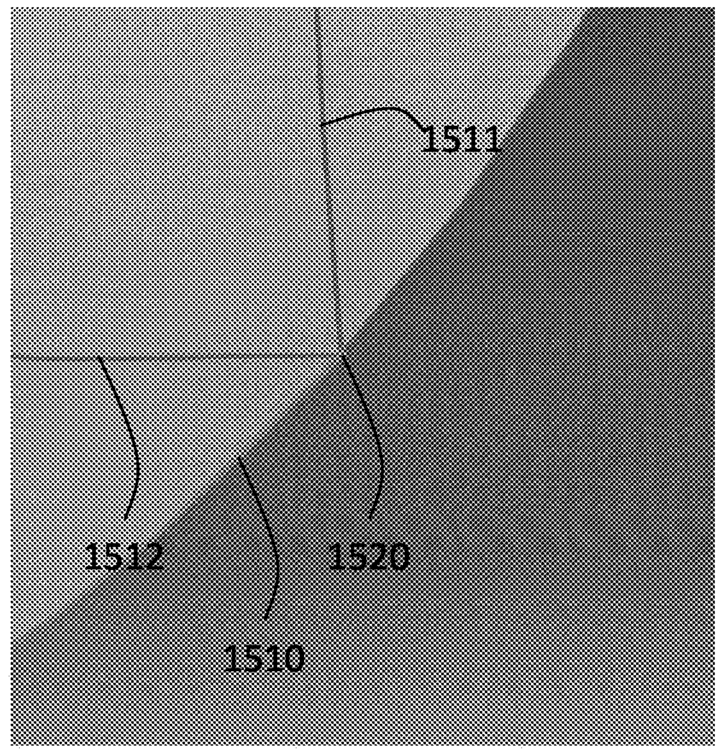

Reference is made to FIG. 15, showing an example of a boundary-curve satisfying the criterion. The edge 1510 has three adjacent edges. One edge is also part of the 3D boundary curve. The two other edges are inner edges 1511 and 1512. These inner edges have one vertex 1520 in common. The method thus does not extrapolate the two edges on the 3D boundary curve sharing the vertex 1520. That is, the method may include the two edges in the complex boundary segment.

As mentioned above, the method may also determine a list of global criteria, which may be used for filling the gaps.

In examples, the filling of the gaps comprises applying a fillet-connect operator to one or more second groups. Each such second group may comprise a boundary-curve edge bounding a planar face, a first chain of boundary-curve edges adjacent to the boundary-curve edge and respectively bounding first fillet faces, and a second chain of boundary-curve edges adjacent to the boundary edge and respectively bounding second fillet faces, the first fillet faces and second fillet faces being two-by two symmetrical with respect to the planar face. The first fillet faces and second fillet faces have two-by-two a similar fillet radius. By "similar", it is meant that a fillet radius of each of the first and second fillet faces may differ in radius length, up-to a predetermined threshold, e.g., 0.15 and 2.5 millimeters. The boundary-curve edge, the first chain of edges and the second set of edges belong to a same concave or convex area.

Alternatively, each such second group may comprise a boundary-curve edge that does not satisfy criterion d), a first chain of boundary-curve edges adjacent to the boundary-curve edge and respectively bounding first fillet faces. The second group also comprises a second chain of boundary-curve edges adjacent to the boundary edge and respectively bounding second fillet faces. The first fillet faces and second fillet faces intersect each other two-by-two and have a similar fillet radius. The boundary-curve edge, the first chain of edges and the second set of edges belong to a same concave or convex area.

An implementation of the determination one or more second groups for applying the fillet connect operator, by checking for fillet areas that can be connected together is now discussed.

The methodology to find joint fillet faces in this implementation is the following, for each edge of the 3D boundary curve:

- Retrieve the face bounding the boundary-curve edge
- The method finds a face adjacent to the retrieved face. The two faces have to be fillet. If it is not the case, the method may continue to another boundary-curve edge.

The method may perform two conditions to find either symmetric joint fillets or asymmetric joint fillets.

The first condition, used for finding symmetric joint fillets, is:

- If the face of the current edge is planar and the fillet faces are symmetrical and the radius are almost the same, (i.e., up to a threshold is between, e.g., 0.15 and 2.5 millimeters), and the two faces belong to the same concave or convex area, or
- If the face of the current edge is in an intersecting area and the two fillet faces are intersecting each other and the radii are almost the same (up to a threshold of, e.g., 0.15 millimeters, the radii called "symmetrical radii"), and the two faces belong to the same concave or convex area.

The method may consider the faces satisfying previous evaluation as the first level of the joint fillet. The method may continue by retrieving faces adjacent to the two fillet faces satisfying the first condition. The method may avoid the face of the current edge. The method may thus continue with a second level. The method may check if it can be considered as a second level, by testing the adjacent faces with the same first condition. The method may repeat the same process until reaching the fourth level.

Reference is made to FIG. 3, showing a flowchart for checking the first condition.

The other condition, used for finding asymmetric joint fillets is, if the face of the current edge is an intersecting area and the fillet faces are intersecting each other, and (additionally) the radius of both faces are almost the same (i.e., up to a threshold, e.g., 2.5 millimeters, named "non symmetric radii" much bigger than the radii of the first condition) and the two faces belong to the same concave or convex area.

As in the previous condition, the method may consider that faces satisfying the other condition as the first level. After that, there is a difference between with respect to the previous first condition: the method allows in the addition of faces, that is, the "fillet pattern", the connection between fillet and non-fillet faces as long as they are intersecting each other. That is, the method may perform the detection of the second level of faces in the same manner as the first level. For the third level, the method only checks if one of the faces are fillets.

Reference is made to FIG. 4, showing a flowchart for checking the second condition.

Figure 16:
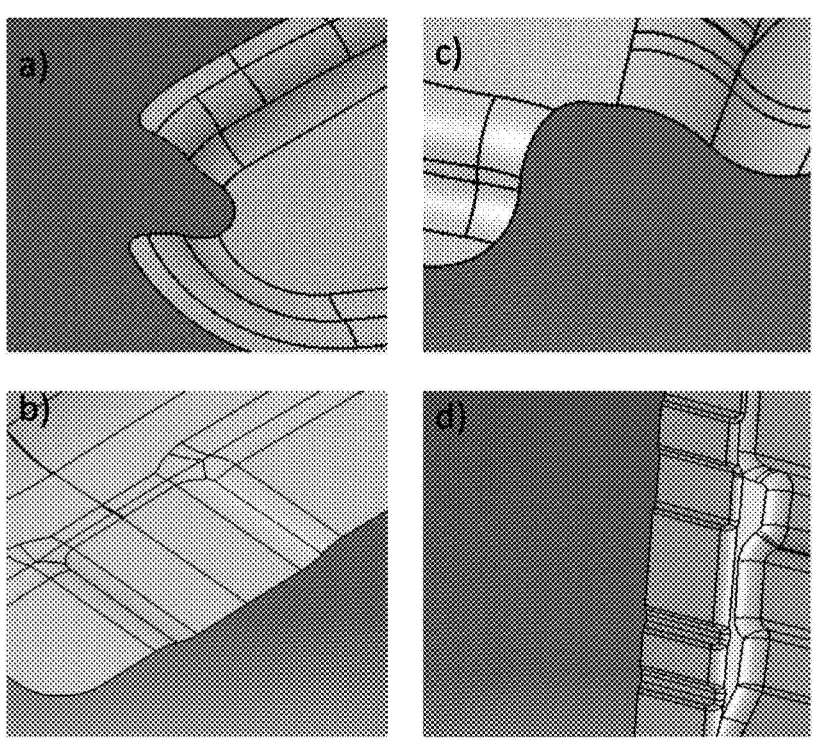
Figure 17:
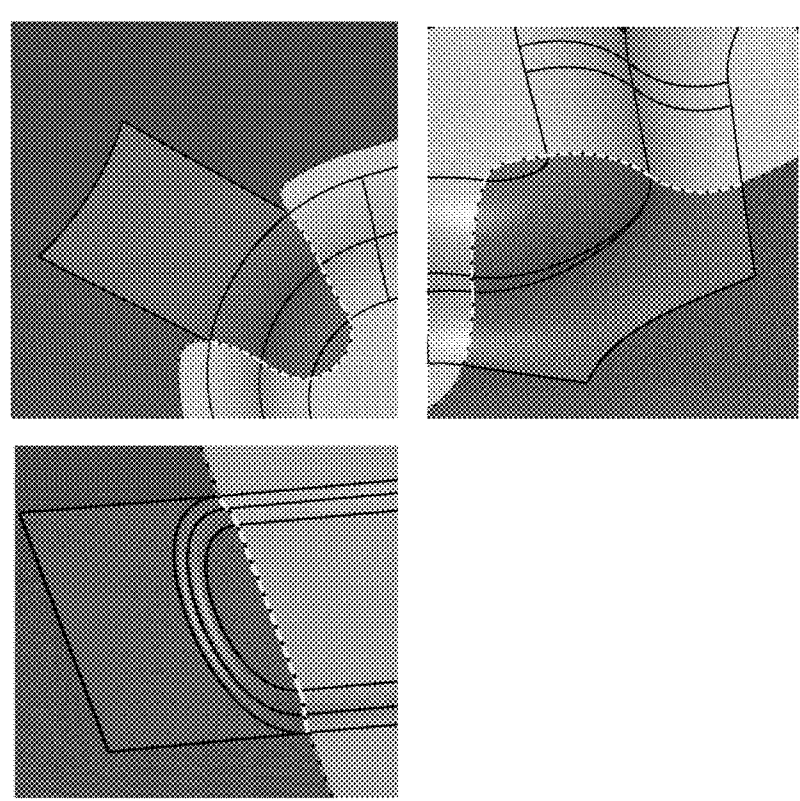

Reference is made to FIG. 16, showing four examples of joint faces comprising fillet faces (FIG. 16, a)-d)). The four examples a)-d) correspond to different joint fillet faces. For example, FIGS. 16*a*) and C) are joint fillet faces comprising asymmetric fillet faces, where the inner edges of the fillet intersect towards the center. By "intersecting towards the center" it is meant that there may be extrapolation lines, defined at the inner edges in an outwards direction to the 3D boundary curve, which intersect. That is to say, the inner edges of the edges do not intersect directly, but rather the theoretical extrapolation lines. FIGS. 16*b*) and *d*) comprise symmetric joint fillet faces. FIG. 17 shows possible extrapolation results (shown with darkened faces).

Figure 18:
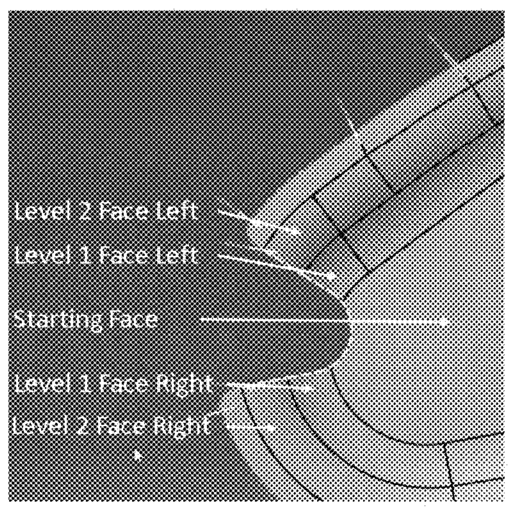

FIG. 18 shows an example of the finding of joint fillet faces.

An implementation of the check to find small edges is now discussed.

After having dispatched all edges inside a specific classification, the method may traverse the boundary-curve edges classified for Surface Extension. The method may classify automatically a remaining boundary-curve edge for Surface Extension if the remaining boundary-curve edge has not been treated by the above checks. If the length of a given boundary-curve edge is less that a specific threshold, e.g., less than 0.25 mm, the method classifies the boundary-curve edge as a tight area, and thus be included inside complex boundary segments.

Figure 19:
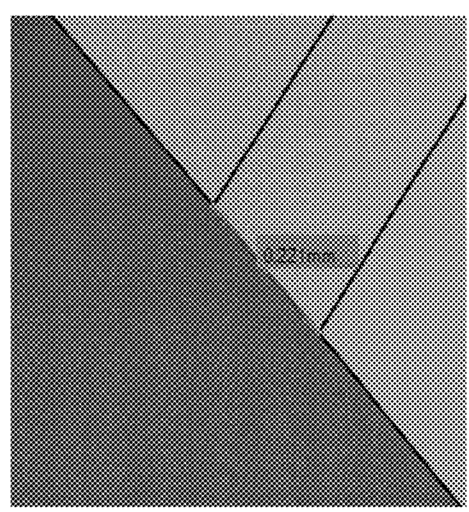

FIG. 19 shows an example of a small edge.

An implementation of the split by convex areas is now discussed.

As mentioned before, the application of the Surface Extension operator has a better rate of success if the area of the 3D boundary curve in which it is applied is not too large. Therefore, the method may split segments where there may be inversion between convexity and concavity on the 3D surface model.

For each of the convex areas, the method may loop on the inner boundary-curve edges belonging to a corresponding convex area. The method may take the middle point of each boundary-curve edge. If the point in the middle of the boundary-curve edge is at a distance zero from the 2D convex bounding curve, the method determines the length of the edge. The method thus repeats the verification of concavity or convexity of the edge with respect to the 2D convex bounding curve, however the verification is only repeated for first boundary-curve edges (that is, being classified for the application of surface extension). This is a matter of implementation, as the method already determined if each boundary-curve edge belongs to a concave area of the 3D boundary curve. Thus the method may alternatively not repeat the verification and directly verify the length of the current edge. If the length of said edge is within a predetermined threshold, e.g., below 50 mm and above 2 mm. If it is the case, the method may classify edge as a Connect Surface.

In an example implementation, the method may classify the boundary-curve edges by the types of operators applied to generate the patches, for example:

Surface Extension,
Connect Surface,
Fillet Connect,
Complex.

In examples, each second extrapolation patch obtained by the application of a fillet-connect operator may be formed by several faces. Each of the faces may be bounded by at least one second boundary-curve edge and at least one edge which is outside the first B-Rep model and joins two vertices of the 3D boundary curve.

In examples, the application of the surface-extension operator to each first group may be constrained by planes at both extremities of the first group. The planes may delimit two-by-two respective second groups. Each of the respective second group may be oriented depending on the geometry of the respective second group and on the type of operator applied to said respective second group.

This results in an extrapolation without imperfections such as twists, chirps or torsions between boundary edges of the first group and the second group, as the gaps are filled while being constrained by the planes. That is, the second extrapolation patches connect the first extrapolation patches while avoiding intersecting the first extrapolation patches, thanks to the constraints set by the planes.

Before executing the last criteria, the method may proceed to create the extrapolations. After all the previous steps, the method may obtain multiple lists with edges in them.

For each list that are going inside the same type of segment, the method may regroup them and compute an assembly. An assembly is a computation that allow to create multiple grouped curves based on boundary-curve edges. For example: two edges may be connected together if the distance between them is less than 0.001 mm. If it is not the case, they may be disconnected. After the assembly, the method may obtain a group of grouped curves. For each grouped curve, the method may create a data structure (e.g., a c++ term) with the following data: the type (e.g., one of a surface extension boundary, connect-surface, fillet-connect or complex), the grouped curve (the regrouped boundary-curve edges), the corresponding faces, and the neighbor grouped curves. This may be done for each type of segment. In the end the method may obtain a data structure indicating, for each grouped curve, its left neighbor and right neighbor, as illustrated below:

Data 1: Surface Extension Boundary: neighbor left 0 neighbor right Data 2
Data 2: Connect Surface Boundary: neighbor left Data 1 neighbor right Data 3
Data 3: Surface Extension Boundary: neighbor left Data 2 neighbor right Data 4
Data 4: Complex Boundary: neighbor left Data 3 neighbor right Data 5
Data 5: Surface Extension Boundary: neighbor left Data 4 neighbor right Data 6
Data 6: Fillet Connect Boundary: neighbor left Data 5 neighbor right Data 7
Data 7: Surface Extension Boundary: neighbor left Data 6 neighbor right 0 or Data 1 is input 3D boundary curve is closed.

An implementation of the creation of the planes is now discussed.

The method may loop on the created data to build the planes at the extremity of the grouped curves corresponding to boundary-curve edges classified as surface extension. The method may add the data with the following condition (where symbol "==" means "equals to" or "is"):

If left neighbor==Surface Extension and right neighbor==Surface Extension and data current==Connect Surface Boundary
If left neighbor==Surface Extension and right neighbor==Surface Extension and data current==Complex Boundary
If left neighbor==Surface Extension and right neighbor==Surface Extension and data current==Fillet Connect Boundary The method may construct parallel planes, for the case connect surface, if the face corresponding to the grouped curve is full, the method may construct parallel planes (it means that the grouped curve comes from an intersecting area, therefore, the method avoids intersection in further surfaces). The planes may be tangent to the surface and normal to the curve.

If the curve is not fully on the face (cannot retrieve inner edges based on the curve), the method may compute planes tangent to the surface and normal to the curve. But if an inner edge is found, the method may authorize the planes to be put in tangency with the inner edge. The method may build and orient the planes.

Figure 20A:
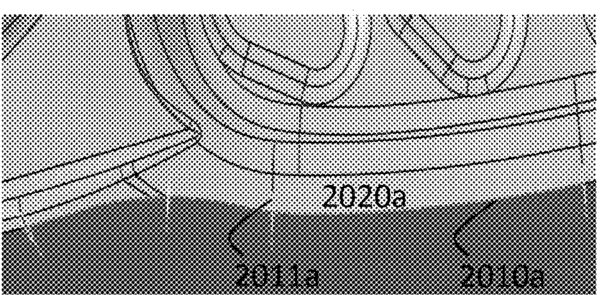
FIGS. 20A, 20B, 20C, 21, 22 and 23 illustrate examples of filling gaps by the method.

FIG. 20A shows a first example for defining the planes. If the 3D boundary curve 2010*a* is not fully on the face 2020*a* (that is, the method cannot retrieve inner edges based on the curve), the method may compute planes tangent to the surface and normal to the curve. But if an inner edge 2011*a* is found, the method authorizes the plane to be put in tangency with the inner edge 2011*a*.

Figure 20B:
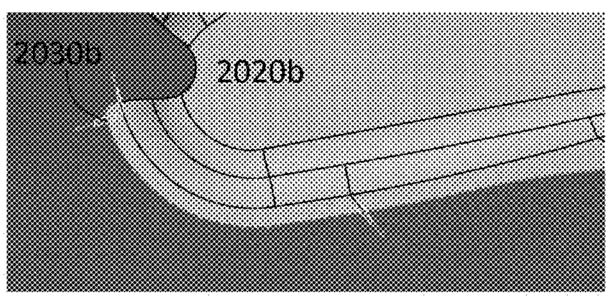

FIG. 20B shows the case of joint-fillet face 2020*b* (where fillet connect is used as an operator to fill the gap). The method defines the planes to avoid intersection between them. Thus, the method rotates the planes 2030*b* until to impede intersections of the extrapolations.

Figure 20C:
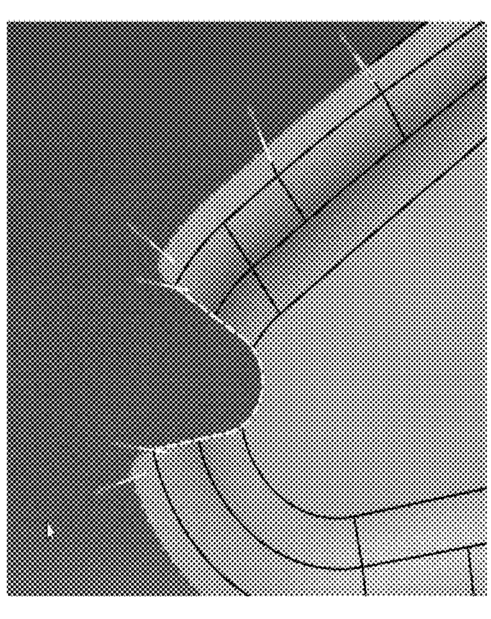

FIG. 20C shows a second example for defining the planes. It illustrates that the method may allow the planes change its orientation.

When the method computes the planes, these may be set on the data as classified as being Surface Extension Boundary. That is, the planes are not used on boundary-curved edges classified as connect surface or fillet connect. In other words, the planes are dedicated for the application of the Surface Extension operator even if these are built from connect surface or fillet connect segments.

Also, the planes may be slightly rotated of 0.5 deg towards the inside of the surface extension boundary. This rotation at the tolerance may allow the extrapolation to be more tolerant on models coming from other CAD.

Figure 21:
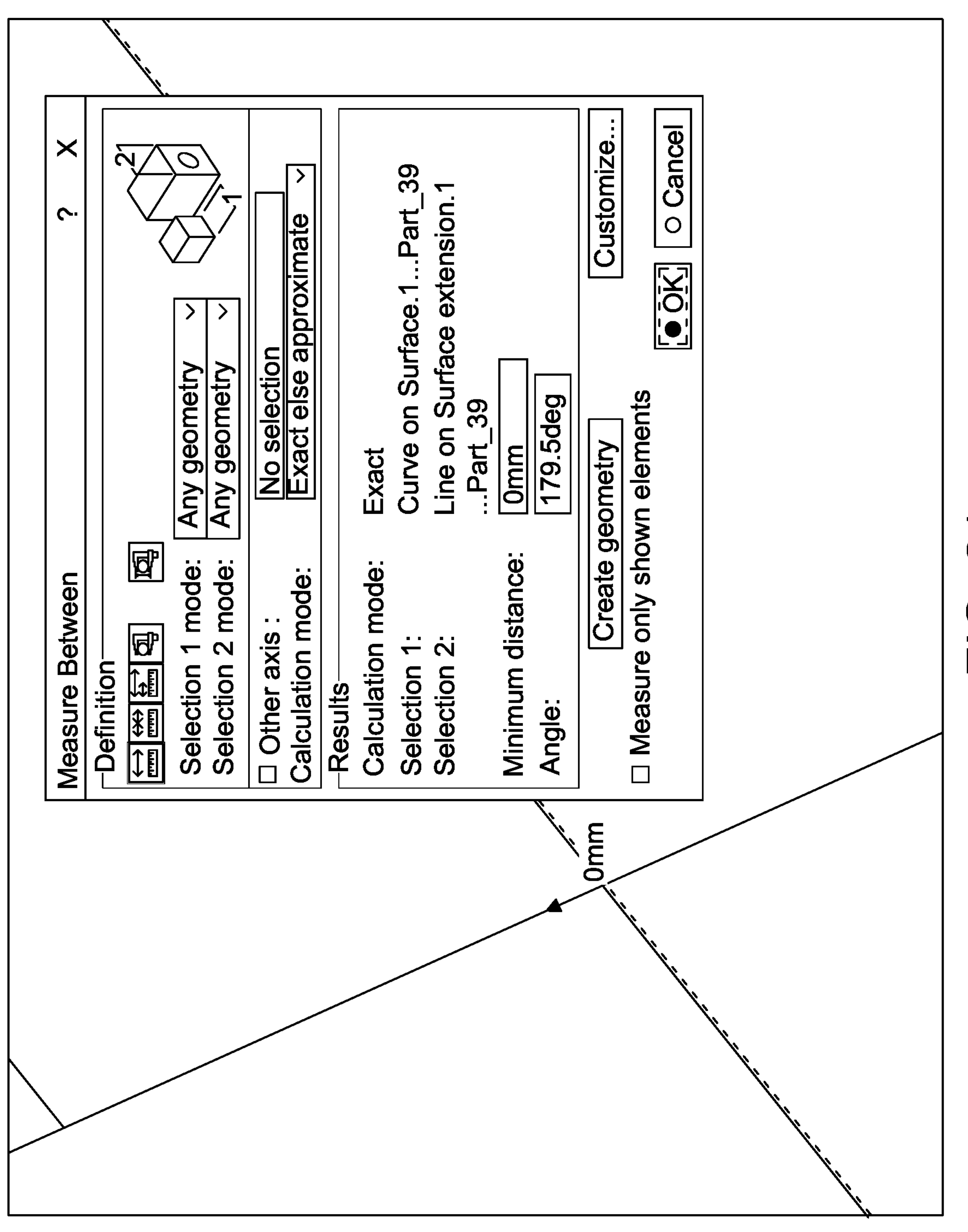

For the type complex boundary, the planes may be tangent to the surface and normal to the curve. FIG. 21 shows a screenshot illustrating an edge being of complex boundary, and a tangent plane computed in a tight vertex.

Figure 22:
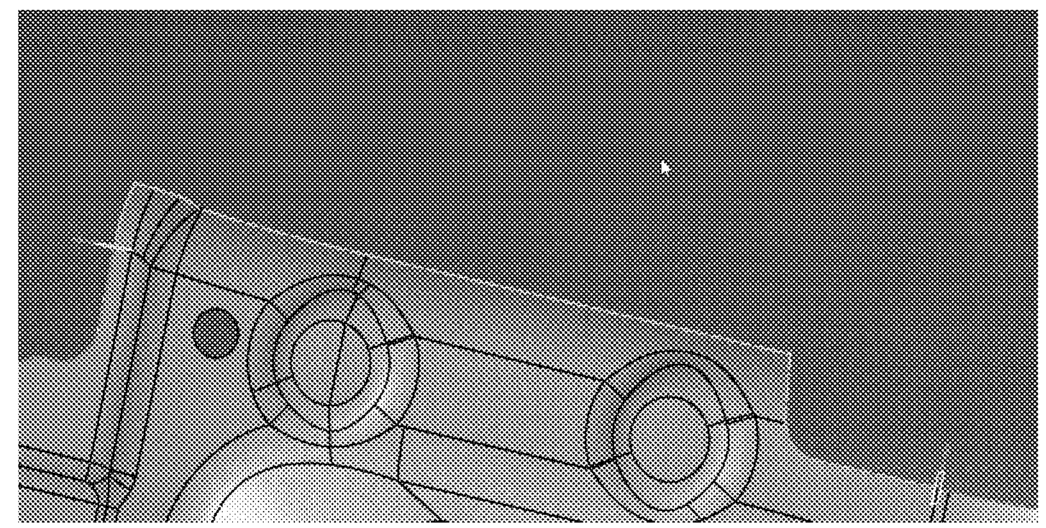

The method may create, for all the data, a specific feature with a type corresponding to the type of the data (e.g., object model), with a link to its neighbor (at the feature level). These data may be added to a master feature called Boundary Analysis managing the update of all the specific features. FIG. 22 shows an example of the image comprising different types corresponding to the type of the data, e.g., the dashed boundary corresponds to a complex type boundary-curve edge.

Examples below describe an implementation algorithm for preparing the groups to the application of the surface-extension operator. The algorithm may be referred to as "Surface Extension Manager".

The input in this implementation for the surface extension is the boundary analysis performed in the previous check. That is, the surface extension operator receives all of the data comprising the classified edges, the planes computed by the method. The surface extension operator may also receive an axis system, a 3D boundary curve and a 3D Surface model representing the main body of the stamping part. (that is, the first B-Rep model). Alternatively, the axis system may also be automatically determined.

With the input, the method may obtain a list of segments with a specific type (among surface extension, fillet connect, connect surface and complex). The method may first identify if there is a possibility that adjacent segment has the same type. For example, if there exists three adjacent surface extension segments, the method may only construct one extrapolated surface.

- Apply the surface extension operator on the first groups extrapolated surfaces.
- Optionally, the method may validate the extrapolated surfaces according to a curvature criterion (optional). For example, the method may verify the curvature of the extrapolated faces one with the other.
- The method may fill gaps by applying the connect-surfaces operator on respective second groups. The connect-surface thus fills the corresponding gaps.
- Optionally, the method may validate the filled gaps according to a curvature criteria.
- The method may apply the fillet-connect operator on respective second groups. Thus, the fillet-connect connect the joint fillet faces together.
- Optionally, the method may validate the extrapolated surfaces according to a curvature criteria.
- Optionally, the method may create extrapolated surface on second boundary-curve edges classified as complex boundary segments by applying either the fillet-connect or connect surface operator on the respective second boundary-curve edges.
- The method may finally assemble of all the solutions, thereby obtaining the extrapolated model.

Figure 23:
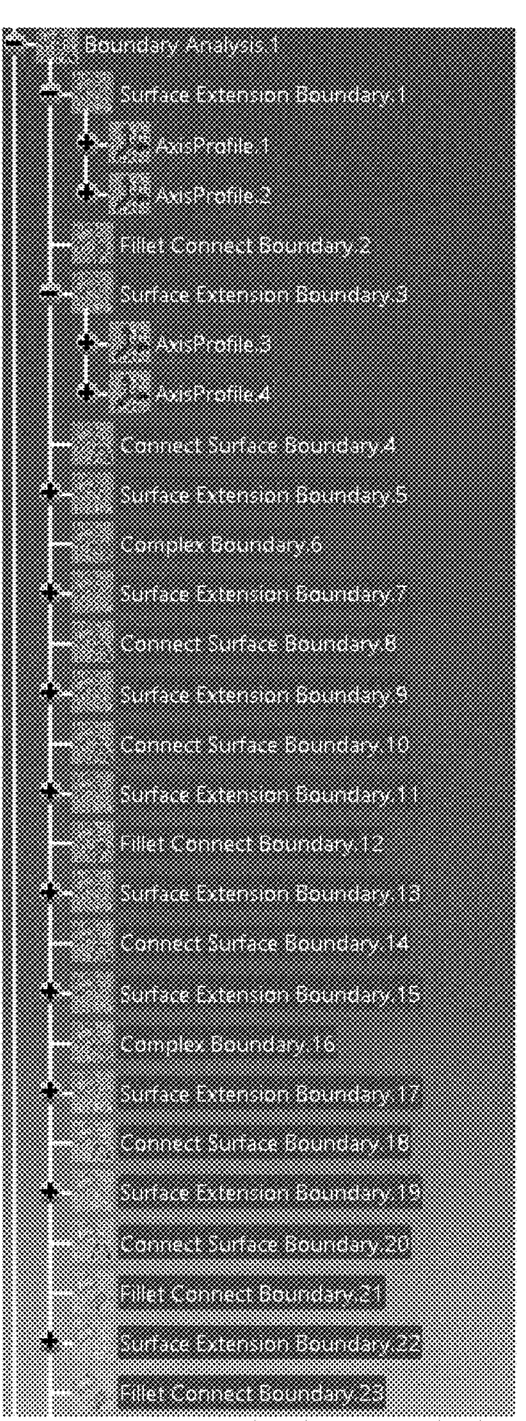
Figure 23:
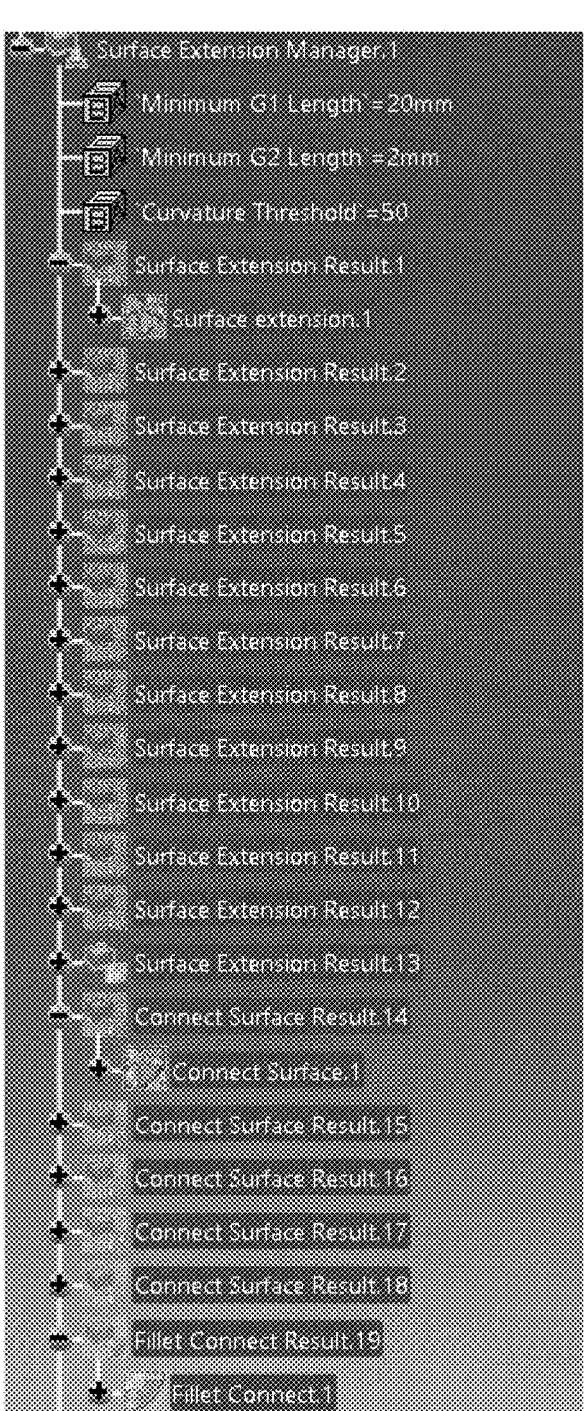

A dedicated feature may be present as a user-interface for the Surface Extension Manager, handling the update of all these features. FIG. 23 shows screenshots illustrating an example of a surface extension manager, showing a classification of the different edges.

In examples, the first value may be set (e.g., as provided by a user or provided automatically) between 10 mm and 50 mm. The second value may be (as well, e.g., provided by a user or provided automatically) higher than 2 mm and/or lower than 5 mm. This corresponds to having flanges of high quality, that can be bent along the boundaries of the part. This is thanks to the g2-continuity allowing a smooth transition between the stamping part and the flanges at zones where the flanges are bent (the zone now being define as being higher than 2 mm and/or lower than 5 mm), while g1-continuity maintains a quality that satisfies manufacturing specifications. The values may be simply set in metric distance and the method may adjust the second (respectively first) value with respect to a reference frame of the modeled stamping part.

The surface-extension operator may be any kind of operator, implemented on a CAD system, which may add faces along a supporting surface of existing boundary-curve edges. The surface extension operator may define delimiting portions along outer vertices of groups of first boundary group edges (notably the first groups comprising first boundary-curve edges satisfying the concavity criterion, but not limited to). The surface-extension operator may add a first face adjacent to a given group of first boundary group edges. The first face may be delimited by extremum edges of the given group. The first face may have a first length and satisfy a g2-continuity within the first length. The surface-extension operator may add a second face adjacent to the first face. In other words, the second face may share an edge with the first face. The second face may have a second length and satisfy a g1-continuity within the first length.

The surface-connect operator may be any kind of operator, implemented on a CAD system, which creates two objects: "fills" and "blends" along the gaps. A fill corresponds to a NURBS surface fitted to the boundaries of the gaps. A blend is usually a swept surface. A swept surface may be defined as a surface obtained by sweeping out a profile in planes normal to a spine curve while taking other user-defined parameters (such as guide curves and reference elements) into account. A first Blend may be added adjacent to the given boundary-curve edge. The first blend may have a first length. The first Blend is g2-continuous along the first length. The surface-connect operator may add second Blend. The second Blend may have a second Blend, which is g1-continuous along the second length. The surface-connect operator may join the fills and blends along the gaps. The fill may be understood as a bounding the blend, constraining it to the gap.

The fillet-connect operator may be any kind of operator, implemented on a CAD system, which creates two objects: "fills" and "splines". The fillet-connect operator may choose a starting face (which may be planar) of the joint fillet. The fillet-connect operator may join, with a spline, inner edges of fillet faces (belonging to the joint fillet) separated by a gap. The fillet-connect operator may the add a fill in the space constrained by the spline and the starting face. The fillet-connect operator may continue this process iteratively, until exhausting all of the faces of the joint fillet separated by the gap.

An example implementation is further discussed.

The example implementation is an example of extension for a Die Face Design process. However, the methodology is the same for a Core and Cavity Separation process. The example implementation provides a solution that may produce an efficient and stable extrapolation, which would involve otherwise manual extrapolation and manual analysis of the boundary of the stamping part, which would be very time consuming.

In this example, multiple commands have been modified to support this user oriented process of extrapolation. The following commands have been modified:

Surface Extension,
Connect Surface, and
Boundary Partition.

This implementation also creates the following commands:

Analysis Boundary,
Surface Extension Manager.

The functionality of the commands is now discussed.

The analysis boundary command creates a feature manager that produces children features or different types of typed (or classified) boundaries. The manager feature analyzes the boundary to extrapolate and create different types of boundaries. The types can be Surface Extension boundary, or Connect Surface Boundary, Complex Boundary or Fillet Connect Boundary.

Figure 24:
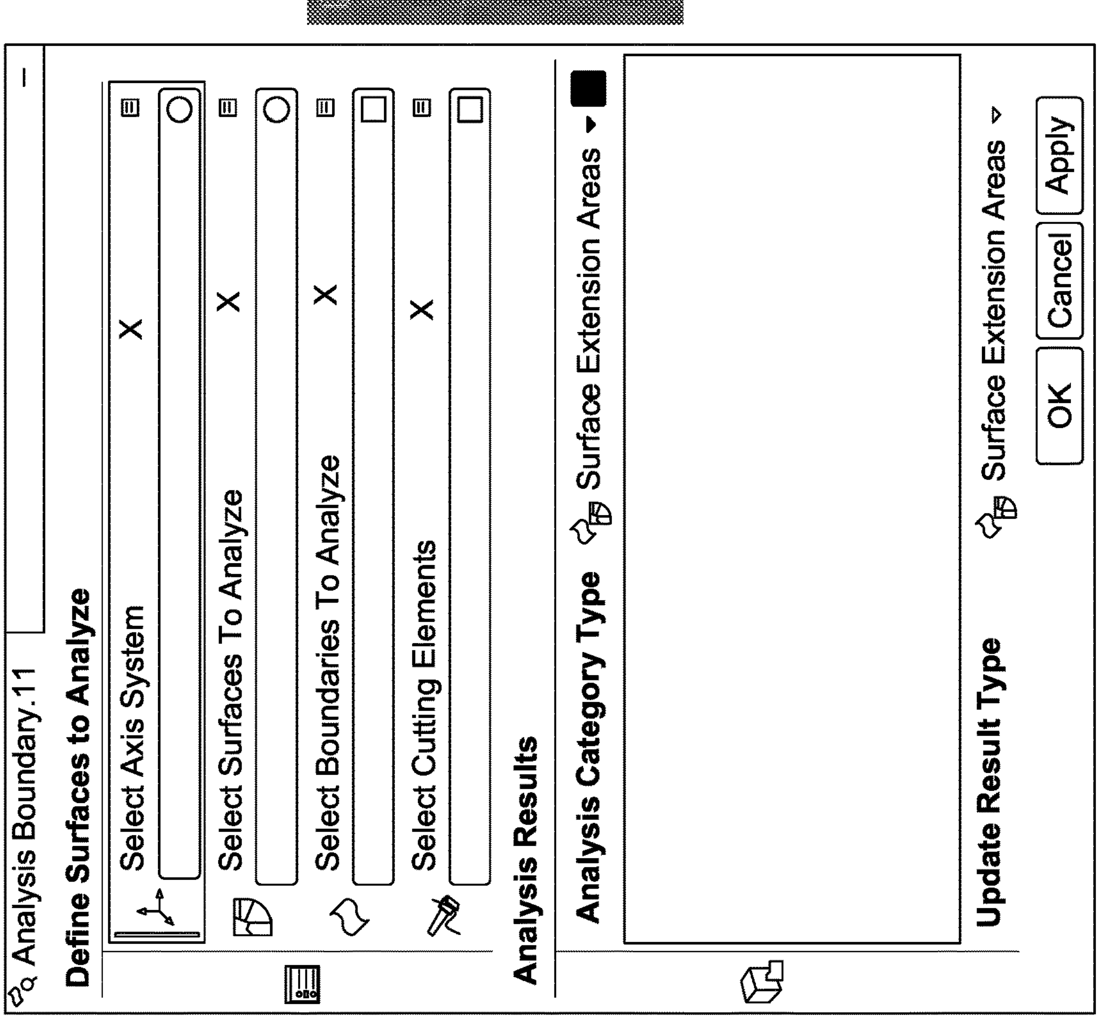

As mentioned previously, previously a user had to analyze manually the boundary. The analysis boundary command performs the analysis automatically for the user. FIG. 24 shows a screenshot illustrating an interface of the analysis boundary command.

The Analysis Boundary command may take as input:

An input direction,
An input surface for the extrapolation,
An input boundary for the extrapolation,
Cutting elements if the user wants to split a children analysis boundary.

Figure 25:
FIGS. 24, 25, 26, 27, 28, 29, 30A, 30B, 31, 32, 33, 34, 35, 36, 37, 38, 39, 40 and 41 illustrate an example implementation of the method.
Figure 26:
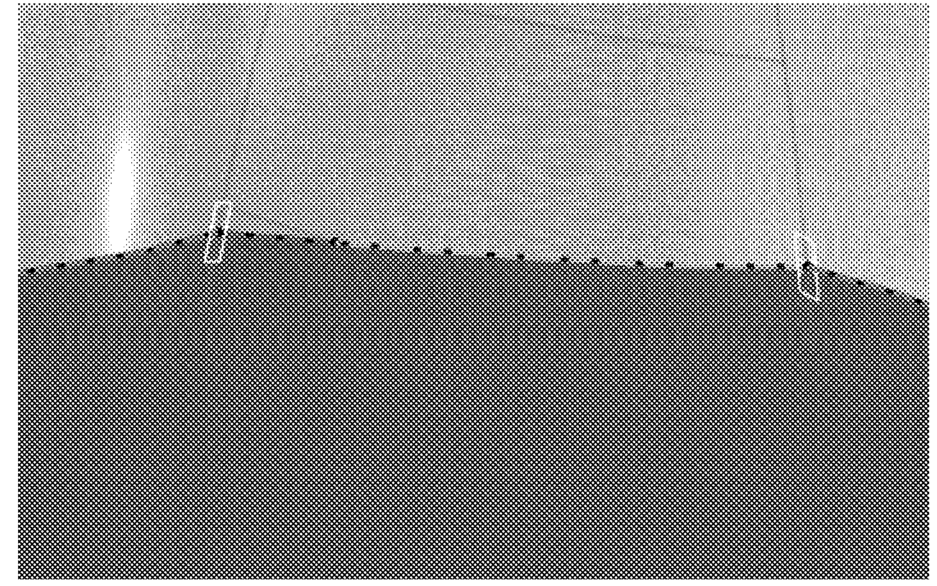
Figure 24:
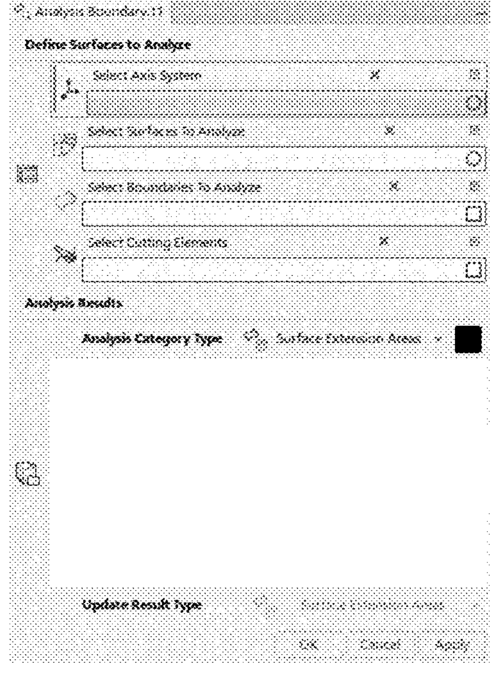
Figure 25:
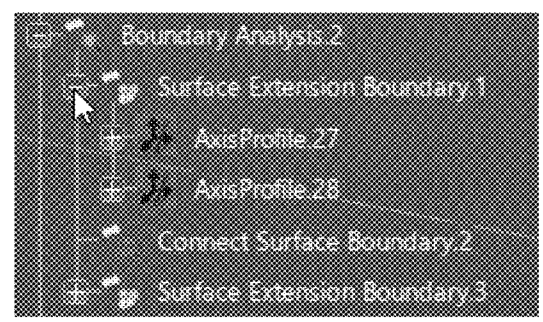
Figure 26:
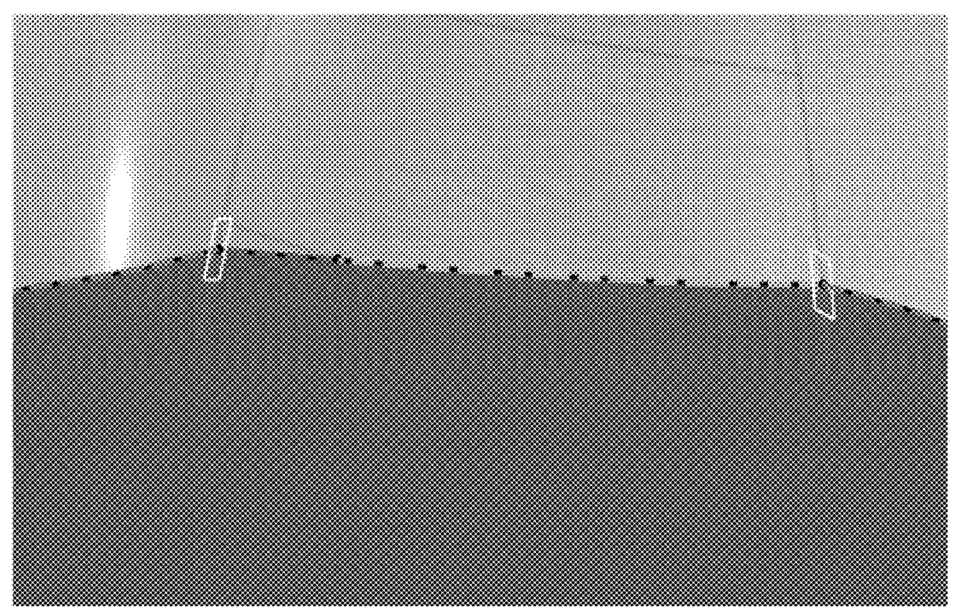

In the specification tree, the user may have an example such as FIG. 25. FIG. 25 shows a screenshot illustrating a spec tree analysis boundary. As shown in FIG. 25, a Surface Extension Boundary contains axis profiles. These axis profiles are the same used for the Surface Extension command. For example, the planes may be retrieved from the boundary. The planes are created by the analysis because these are oriented in a way where Surface Extension works smoothly and Connect Surface fills the gap between two Surface Extension. For example, on this type of configuration, the planes may be oriented like in FIG. 26.

Figure 27:
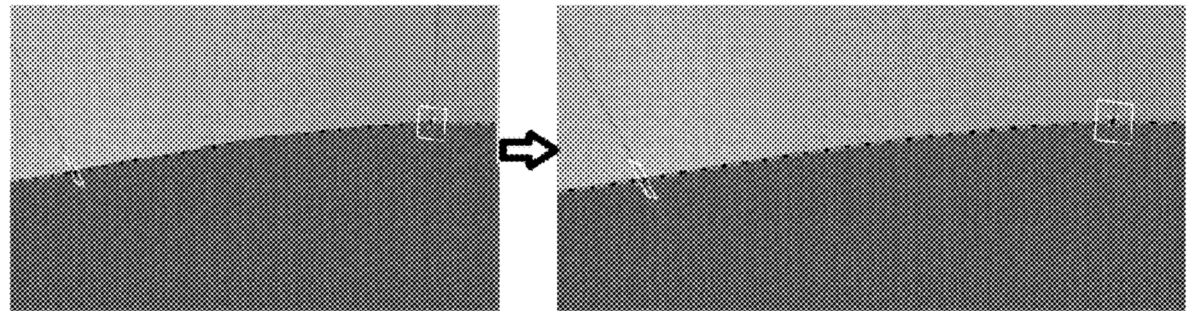
Figure 28:
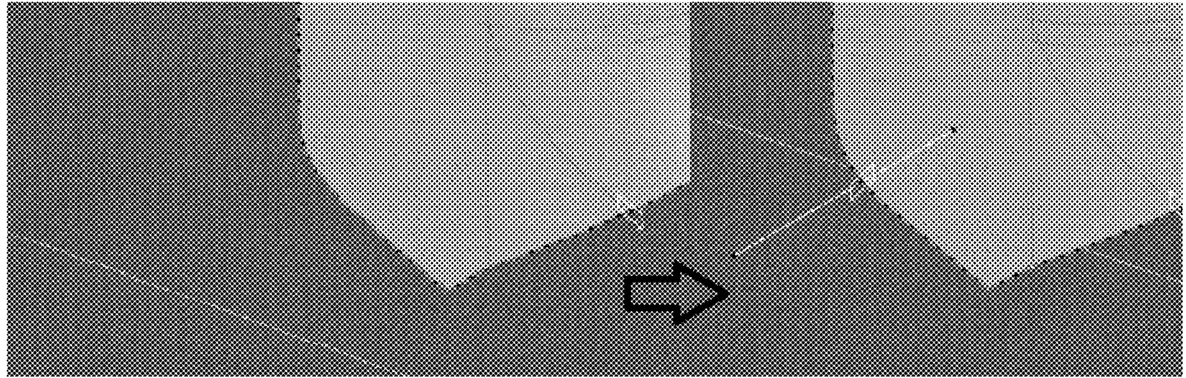

Inside the Analysis Boundary command, the user may be able to modify the type of a boundary: from a transition boundary (connect surface solution or fillet connect solution) to surface extension boundary. In this way, planes may be computed automatically but not oriented automatically. FIG. 27 shows a type of modification of orientation (from the left image to the right image) that may be performed on the planes. If the planes are oriented in the other way from a surface extension boundary to other, the planes may be destroyed. As mentioned earlier, the user can select splitting elements to split a surface extension boundary. The cutting element can be a sketch on a top view. FIG. 28 shows cutting elements.

Figure 29:
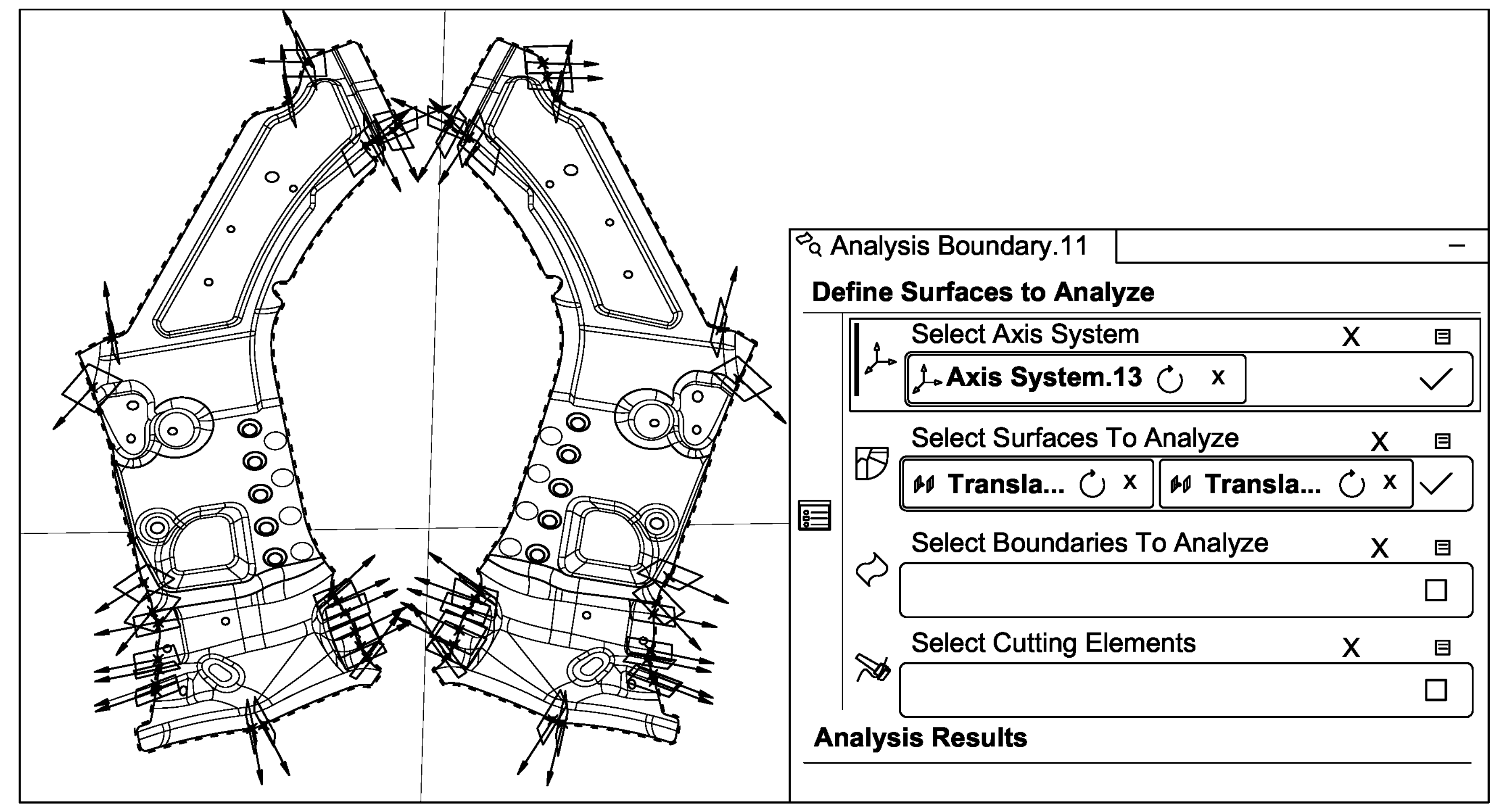

The user may also select two shells that are not connected. FIG. 29 shows a screenshot illustrating two shells.

Figures 30A, 30B:
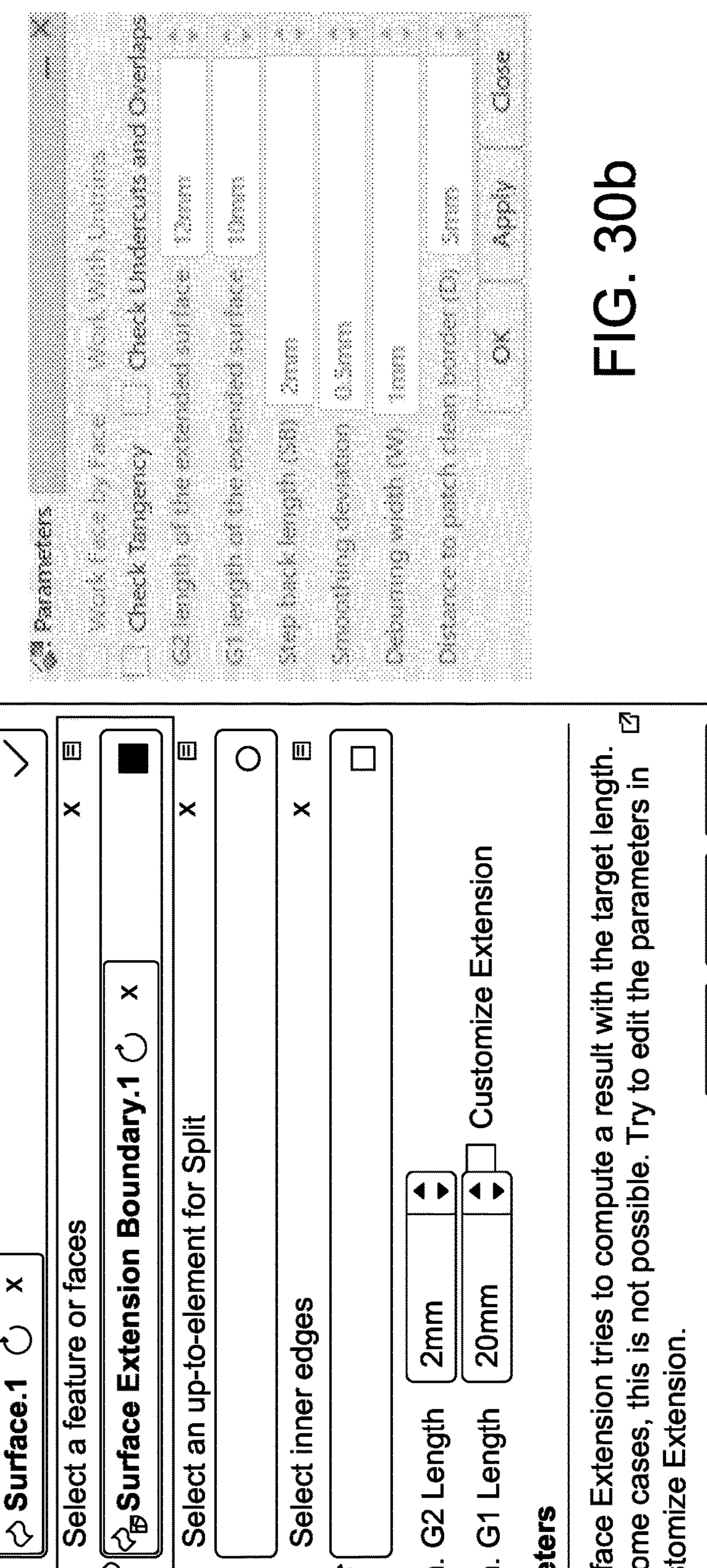

The extrapolation is performed after the boundary is analyzed. It is provided a new option called Auto-Pilot. The UI has been reworked in order to be Auto-Pilot oriented and simpler. FIGS. 30*a* and 30*b* shows screenshots illustrating the new surface-extension UI, reworked to be Auto-Pilot oriented. As said before, an existing solution for performing the extrapolation is Surface Extension. However, Surface Extension is complex to use. It requires to manually enter multiple parameters. Auto-Pilot makes the extrapolation a lot easier, as it only requires setting the minimum length wanted and click OK. By default, Auto-Pilot is activated. FIG. 30*b* shows the parameters greyed out, as these are handled by Auto-Pilot. The user may put the minimum length required and the command may create a minimum of 2 mm of G2-continuity if possible. If not, it may create a G1 extension. All parameters used internally by the algorithm may be set to the feature so they are reusable. In Auto-Pilot, face by face (with untrim) may be computed. The user may click on "Customize Extension" if the user wants to manually modify the parameters and have the same behavior as a standard Surface Extension.

Figures 31, 32:
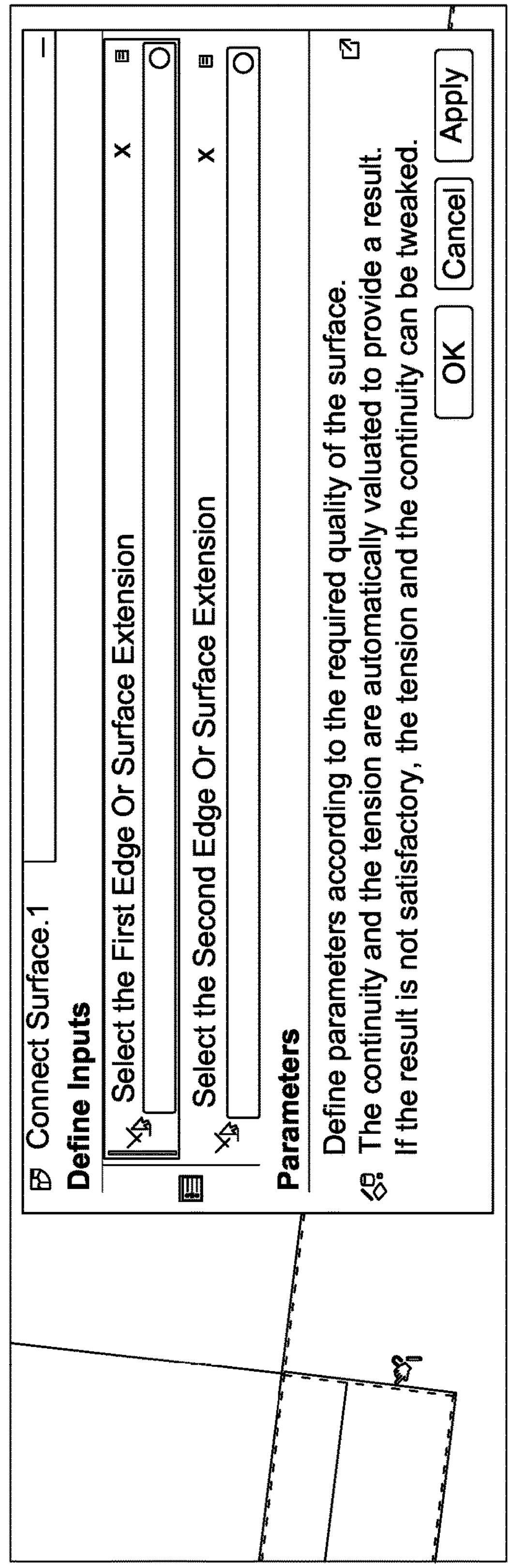
Figure 33:
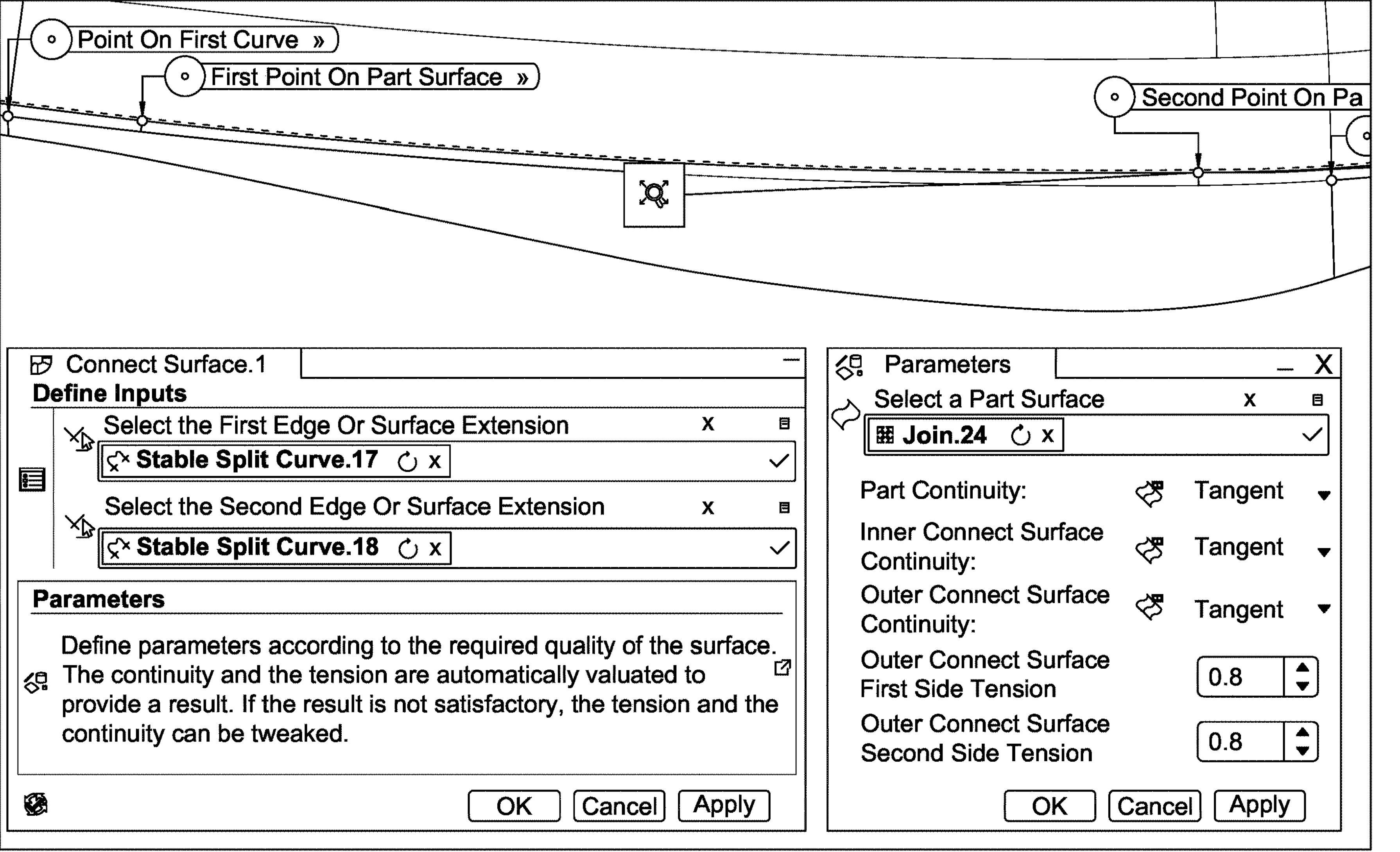

Now that the Surface Extension is able to automatically manage the input parameters, it may be provided a more user-friendly (that is, automated) Connect Surface. Previously, the user had to select the part, then create two stable split curves with the right points; it is often difficult to do it the right way quickly. This implementation improves the selection. The user is now able to click only two surface extensions to connect. The new functionality automatically chooses the right parameters to provide a result (i.e., an extrapolation) and position the parameter at the right place. The user may have access to the previous user experience if desired. The implementation adds another way of selection to the previous user experience: the user can select two edges to connect. Also, the user can now modify the tension of the computed outer blend. FIG. 31 shows a screenshot illustrating an Edge Surface Extension. FIG. 32 shows a screenshot illustrating a Surface Extension Connect Surface. FIG. 33 shows a screenshot illustrating an automatic selection of edges when performing Surface Extension.

The functionalities may be implemented on a feature called Surface Extension Manager. The goal of this feature is to use all the previous exposed functionalities to provide a simple and effective way to compute extrapolations. This function may be done by a Surface Extension Manager command.

Figure 34:
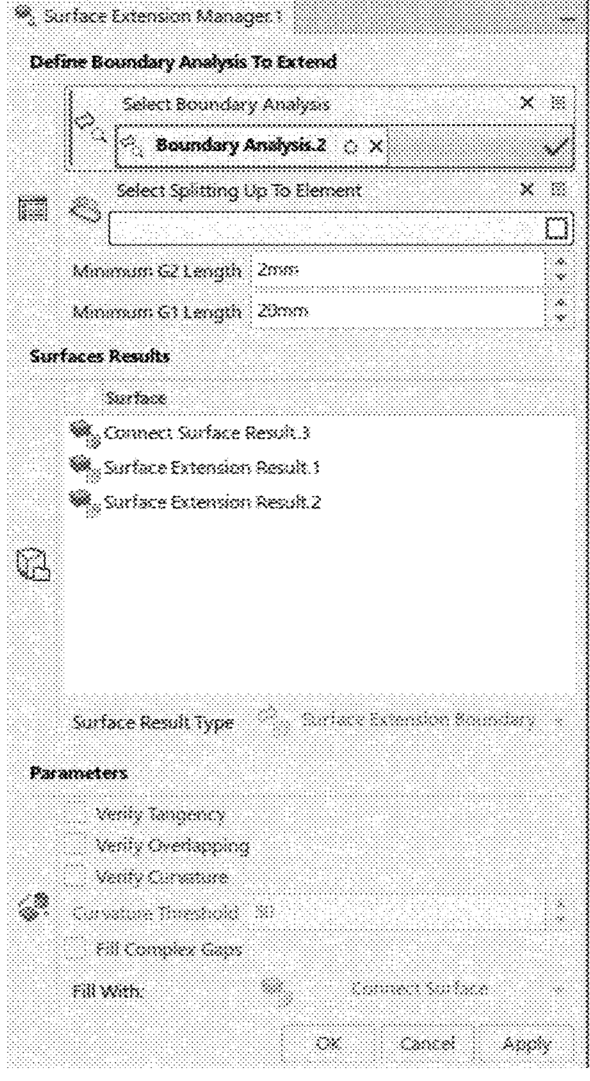

FIG. 34 shows a screenshot illustrating an implementation of the Surface Extension Manager command.

The Surface Extension Manager command may take as input a Boundary Analysis comprising all the information needed to compute extrapolations (e.g., axis, surfaces, boundaries, planes etc.). The Surface Extension Manager may also take as second input a global splitting element (e.g., a Convex Polygon). The Surface Extension Manager command may provide other options such as Check Tangency and Overlapping (a throw is done if these errors are detected).

Two parameters are available in the Surface Extension Manager command:

Minimum G1 and G2 length: extensions may be computed in Auto-Pilot mode with a minimum length requirement for g1-continuity and g2-continuity.

Curvature Threshold: this optional parameter may be used for a sort of curvature mapping of the resulting extrapolation. If the maximum curvature is beyond this parameter, the extension is rejected. This provides the maximum of results having the right surface quality, e.g., the tension of a Surface Extension may be too strong, which is bad for the metal.

The Surface Extension Manager command may compute Connect Surface or Fillet Connect (i.e., piece-wise fill variant) guaranteeing high quality (for example on a "Transition Boundary"). Because the boundary is divided into multiple "Surface Extension Boundary", the Surface Extension Manager command fills the remaining gaps in order to have a complete surface belt. The user may have the option determine the type of fill, by forcing the fill between extensions with the option "Fill Complex Gaps":

With Connect Surface,

With Fillet Connect.

Figure 35:
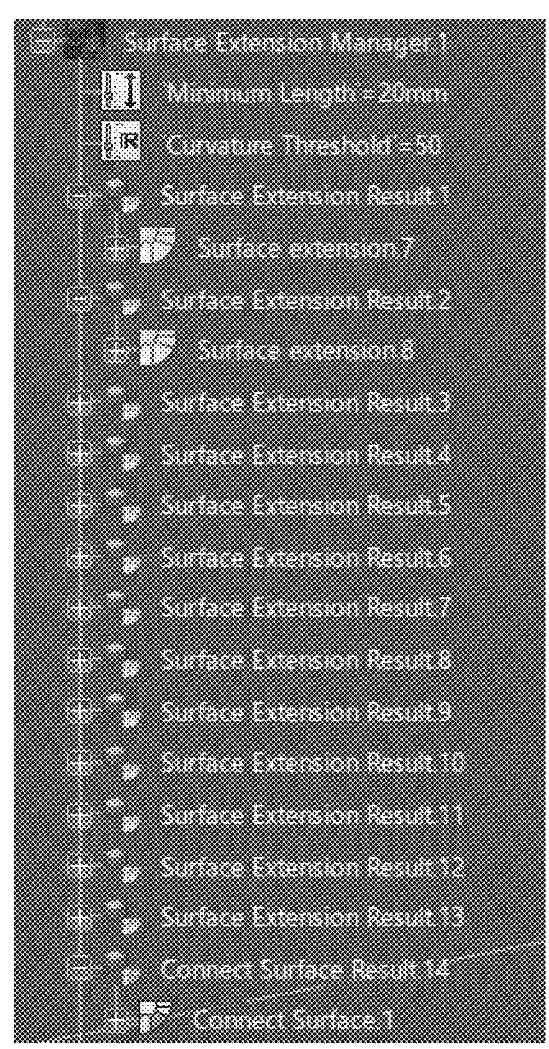

The user may have access to a spec tree such as the spec tree of the screenshot shown in FIG. 35.

Figure 36:
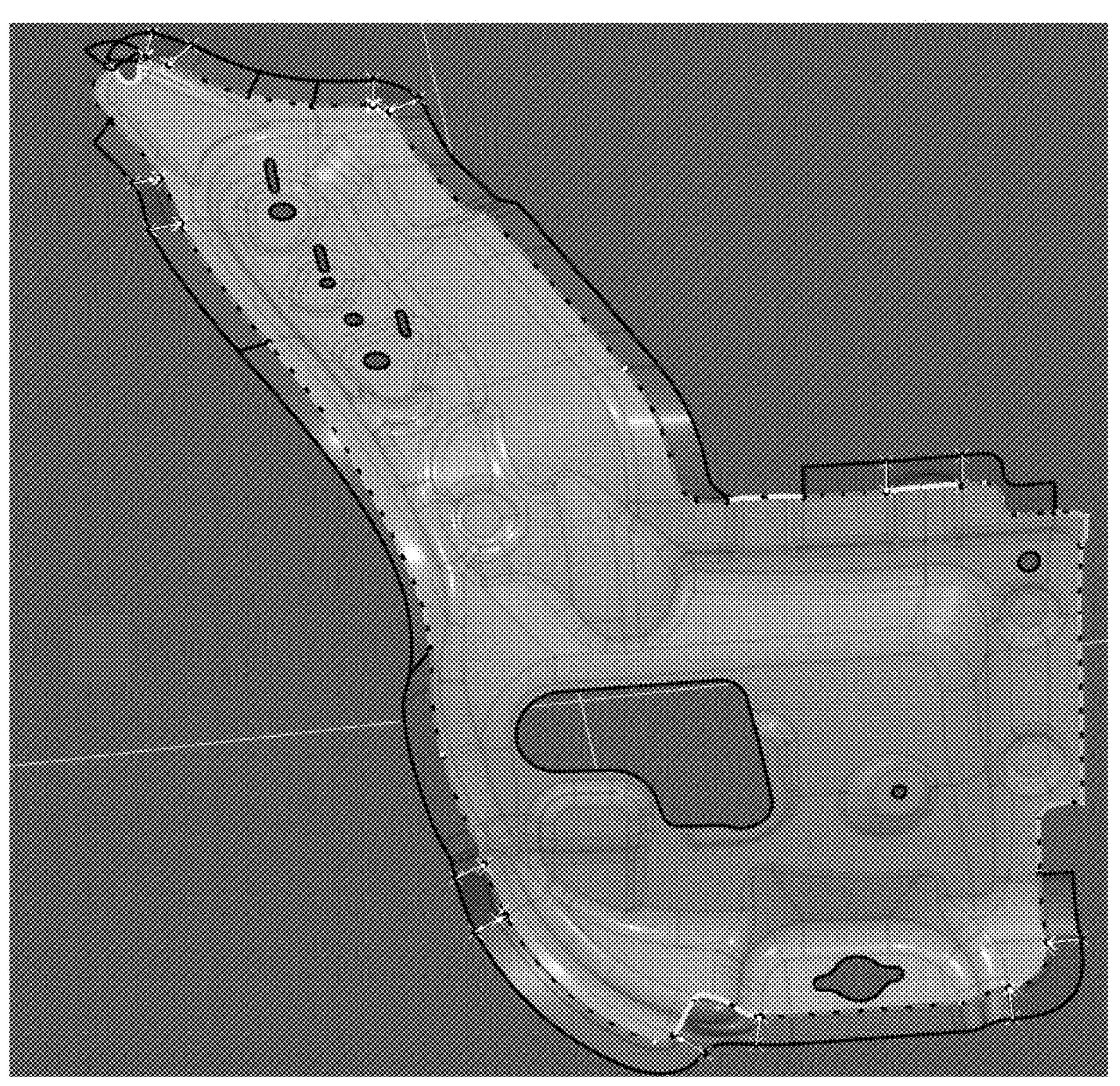

With the data model of the spec tree, the user may be able to edit through the command Surface Extension Manager command each feature: Surface Extension, Connect Surface, Fillet Connect. The modification may be taken into account by the Surface Extension Manager command for the final join. The children features (e.g., aggregating the Surface Extension, Connect Surface) are just a join of their corresponding solution. FIG. 36 shows an example of resulting extensions.

Figure 37:
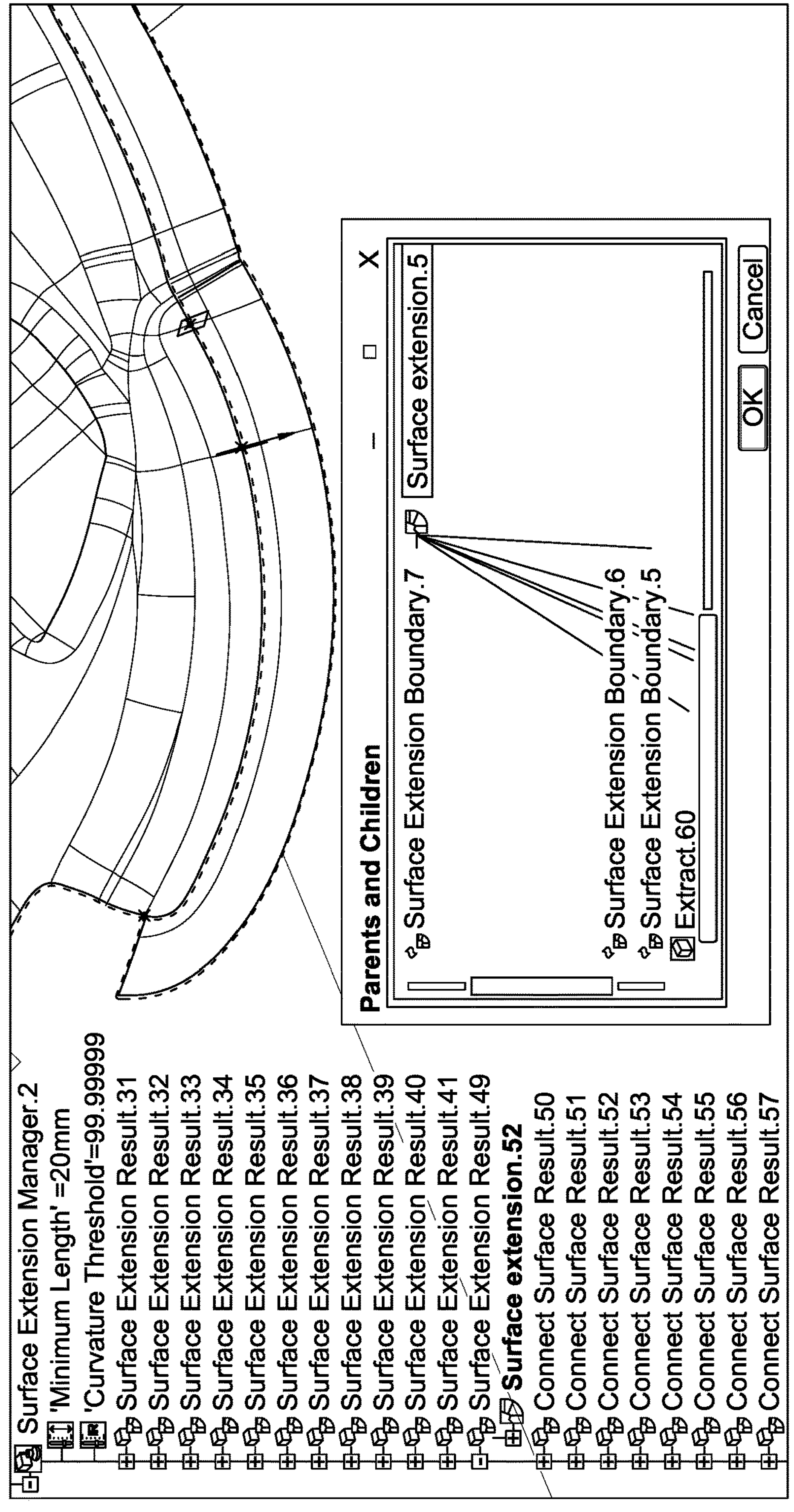

In the Surface Extension Manager command the user may decide to set three adjacent boundaries as "Surface Extension Boundary". The Surface Extension manager computes a unique Surface Extension Result taking as input the three boundaries with the right planes. FIG. 37 shows a screenshot illustrating an example of computing a surface extension from three adjacent boundaries.

It is possible to modify the type of the analysis boundary in order to have extension or other solutions. Also, the user may be able to ignore some results if desired. The user may also be able to impose a specific solution on a boundary for the Fill Complex Gaps option instead of a global solution type.

For example, the user may click on a Surface Extension typed boundary on the Surface Extension Manager command. This allows local modifications the planes may be displayed. The behavior may be the same for the Connect Surface (the Surface Extension Manager may display manipulators of the points) and the Fillet Connect (the Surface Extension Manager may display the manipulator of the spline tension).

Examples regarding automated quality tests are now discussed.

The tests verify the quality of the analysis boundary.

The test protocol of the analysis boundary is as follows:

1) Open an 3DXml
2) Go to Die Face Design
3) Launch Analysis Boundary
4) Select the only surface in the surface selector
5) Click OK.

Figure 38:
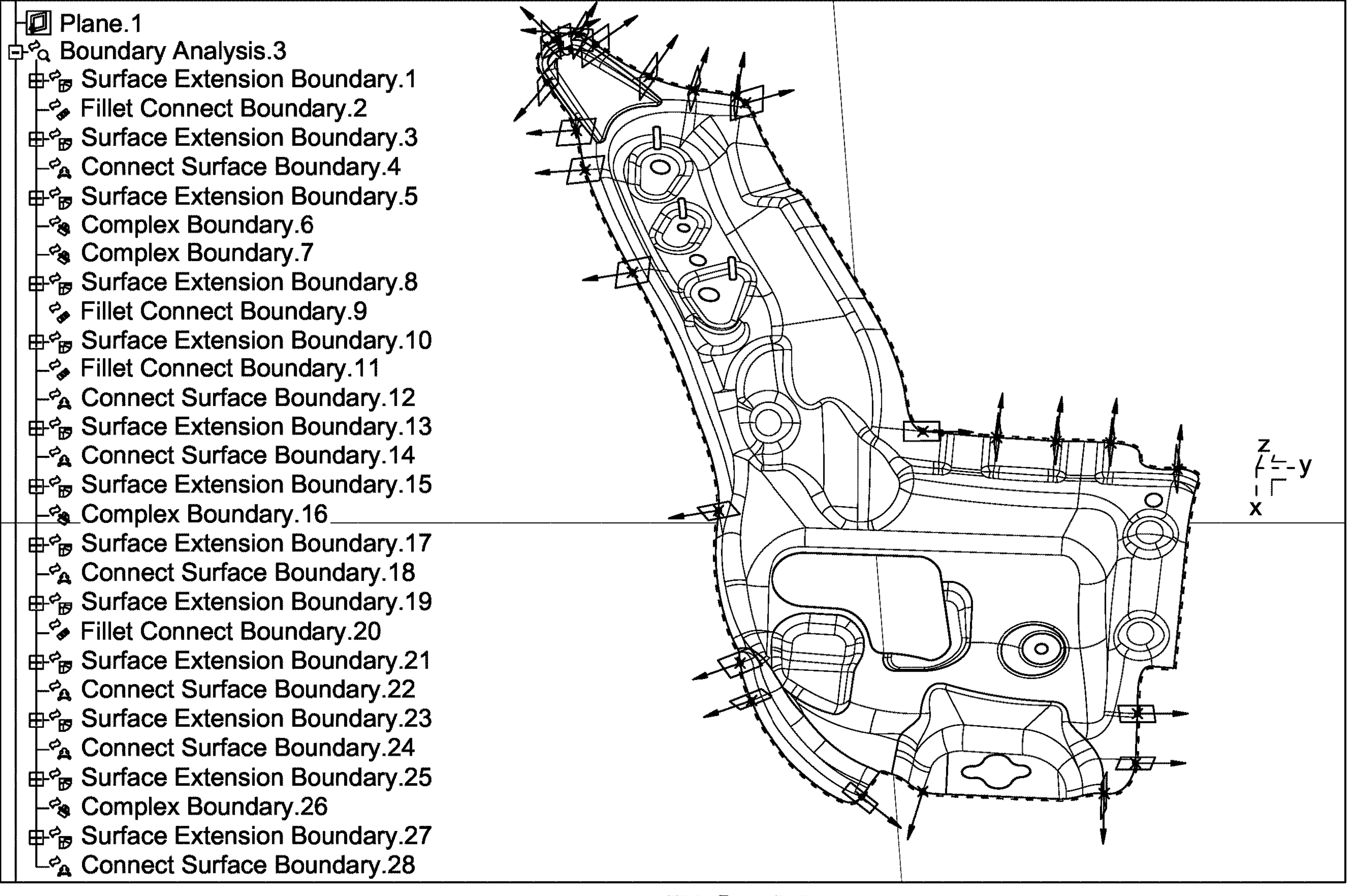

The tests are performed on the part of FIG. 38. FIG. 38 shows a screenshot illustrating the results of the tests, yielding twenty eight boundary results.

The Surface Extension Manager is also tested.

The test protocol of the Surface Extension Manager is as follows:

1) Open the 3DXml
2) Go to Die Face Design
3) Launch Analysis Boundary
4) Select the only surface in the surface selector
5) Click OK
6) Launch Surface Extension Manager
7) Select the Analysis Boundary
8) Click OK.

Figure 39:
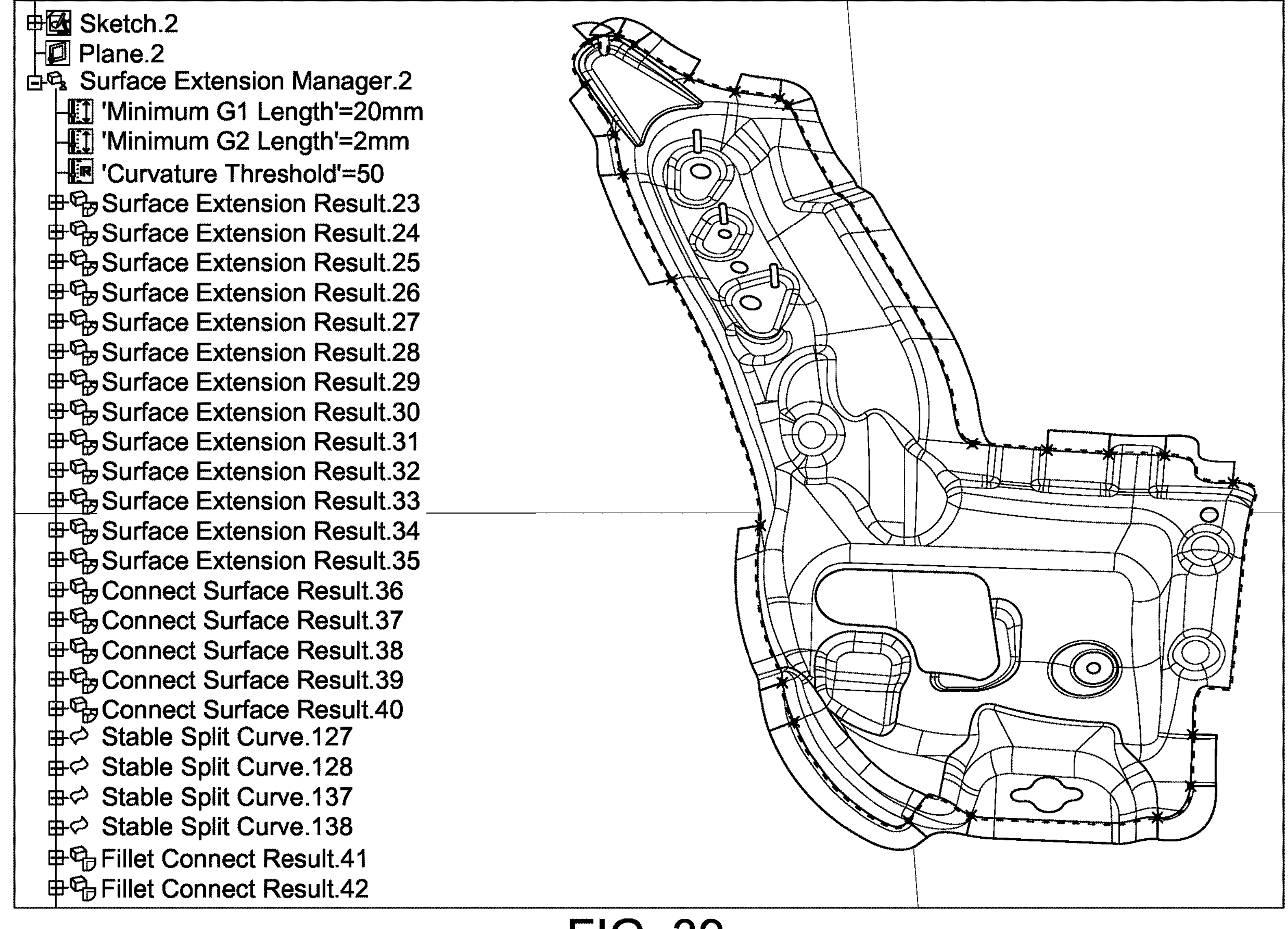

FIG. 39 shows a screenshot illustrating the results of the tests, yielding twenty extension results.

The Auto-Pilot is also tested.

Figure 40:
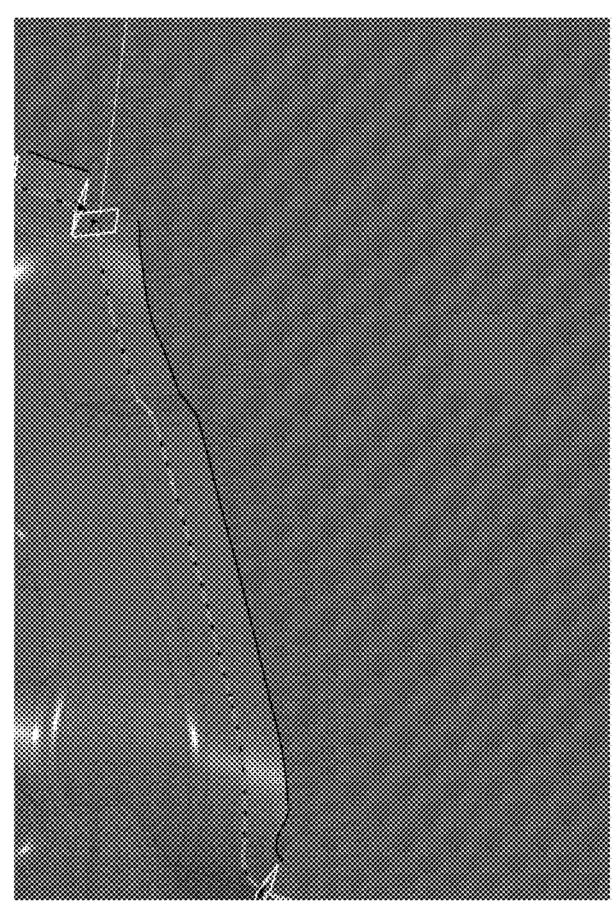

The test protocol of the Auto-Pilot is as follows:

1) Open the 3DXml
2) Go to Die Face Design
3) Launch Analysis Boundary
4) Select the only surface in the surface selector
5) Click OK
6) Launch Surface Extension
7) Select Surface Extension Boundary.15 and uncheck Customize Extension
8) Click OK
9) Launch Surface Extension
10) Select Surface Extension Boundary.17 or 13 and uncheck Customize Extension
11) Click OK FIG. 40 shows the results of the tests.

The Connect Surface is also tested.

The test protocol of the Connect Surface is as follows:

1) Open the 3DXml
2) Go to Die Face Design
3) Launch Analysis Boundary
4) Select the only surface in the surface selector
5) Click OK
6) Launch Surface Extension
7) Select Surface Extension Boundary.15 and uncheck Customize Extension
8) Click OK
9) Launch Surface Extension
10) Select Surface Extension Boundary.17 or 13 and uncheck Customize Extension
11) Click OK
12) Launch Connect Surface
13) Select Surface Extension.1 and Surface Extension.2

Figure 41:
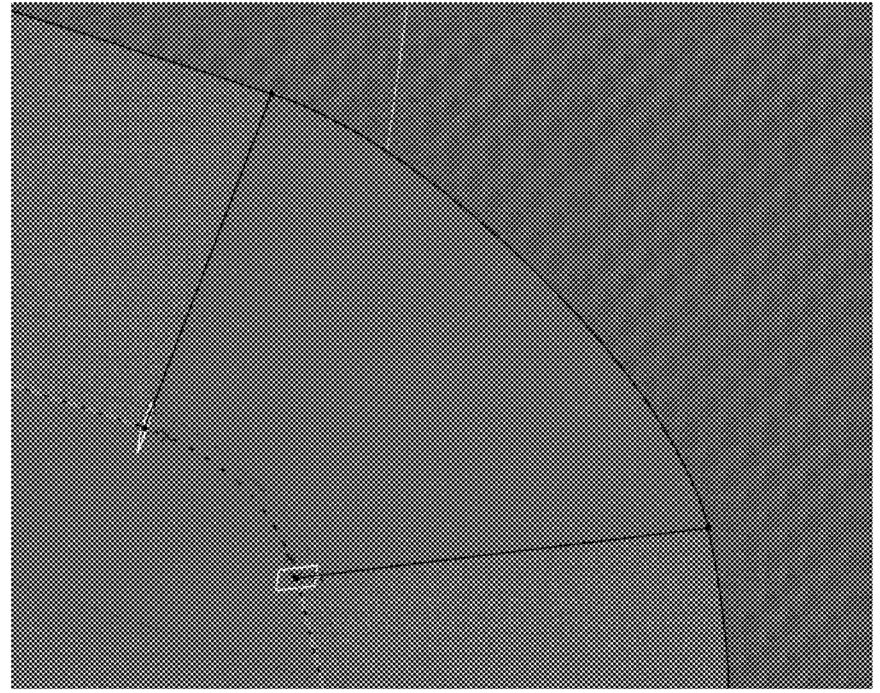

FIG. 41 shows the results of the tests.

Figure 42:
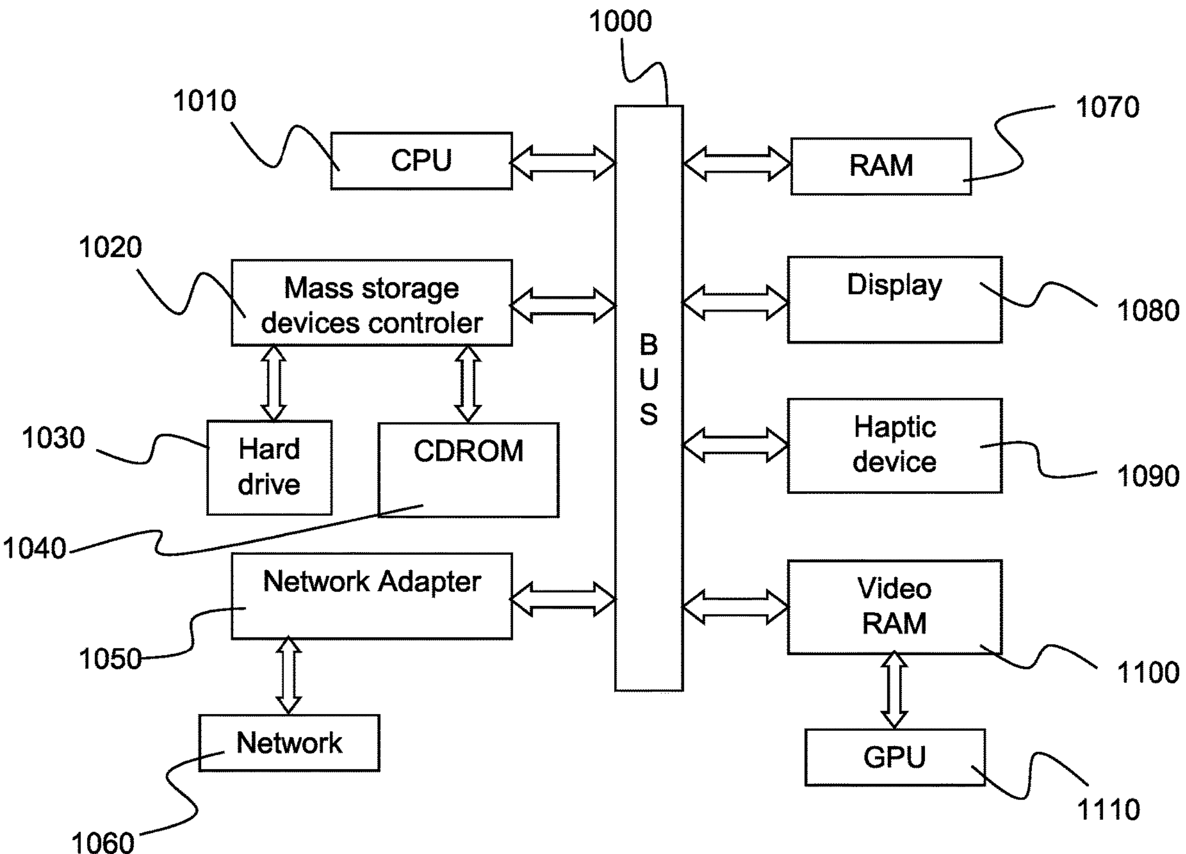
FIG. 42 shows an example of the system.

FIG. 42 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The invention claimed is:

1. A computer-implemented method for designing a stamping part having one or more flanges, the method comprising:

obtaining a first boundary representation (B-Rep) model, the first B-Rep model representing the stamping part without the one or more flanges, the first B-Rep model having a 3D boundary curve formed by a set of boundary-curve edges;

obtaining a first value representing a g1-continuity extrapolation length requirement and a second value representing a g2-continuity extrapolation length requirement;

determining a second B-Rep model representing the stamping part with extra material to be removed to form an unfolded state of the one or more flanges, the second B-Rep model including an extrapolation of the first B-Rep model with extrapolation patches formed along the 3D boundary curve, the second B-Rep model presenting at least a g2-continuity over a length of the extrapolation patches equal to the second value and then at least a g1-continuity over a length of the extrapolation patches equal to the first value, the determination of the second B-Rep model including:

partitioning the set of boundary-curve edges into:

first groups each of one or more consecutive first boundary-curve edges, and second groups each of one or more consecutive second boundary-curve edges, applying a surface-extension operator respectively to each first group, thereby obtaining respective first extrapolation patches formed along the 3D boundary curve and separated by respective gaps, and filling the gaps, thereby obtaining respective second extrapolation patches connecting the first extrapolation patches together and with the first B-Rep at respective second boundary-curve edges.

2. The method of claim 1, wherein the 3D boundary curve includes one or more concave areas and one or more convex areas, at least one convex area including at least one boundary-curve edge of a length higher than a first threshold and lower than a second threshold, the second threshold being higher than the first threshold, each such convex area including a second group.

3. The method of claim 2, wherein, given a 2D convex bounding curve of a projection of vertices of the 3D boundary curve onto a 2D plane, each boundary-curve edge belongs to a concave area of the 3D boundary curve when its projection onto the 2D plane is inside the 2D convex bounding curve, otherwise the boundary-curve edge belongs to a convex area of the 3D boundary curve.

4. The method of claim 3, wherein the 2D plane substantially maximizes an area of a projection of the first B-Rep on the plane.

5. The method of claim 2, wherein each first boundary-curve edge further satisfies any one or any combination of a list of criteria for an edge including:

a) the edge does not bound a variable fillet face or a joint fillet face, b) the edge does not bound a face having an area below a predetermined threshold, c) the edge does not join an inner edge that presents a parallelism with the boundary curve, d) the edge does not join, at its two bounding vertices, two inner edges that present an intersection within a threshold distance from the 3D boundary curve outside the first B-Rep, e) the edge does not bound a fillet face having a theoretical fillet parallel to the first boundary-curve edge, f) the edge is not in a patch area, g) the edge does not join, at a same bounding vertex, at least two inner edges, and h) the edge is of a length above a predetermined threshold.

6. The method of claim 5, wherein the filling of the gaps includes applying a surface-connect operator to one or more second groups consisting of:

at least one boundary-curve edge that does not satisfy that the edge does not join, at its two bounding vertices, two inner edges that present an intersection within a threshold distance from the 3D boundary curve outside the first B-Rep, and/or at least one boundary-curve edge that belongs to a convex area of the 3D boundary curve and is of a length higher than the first threshold and lower than the second threshold.

7. The method of claim 5, wherein the filling of the gaps includes applying a fillet-connect operator to one or more second groups each including:

a boundary-curve edge bounding a planar face, a first chain of boundary-curve edges adjacent to the boundary-curve edge and respectively bounding first fillet faces, and a second chain of boundary-curve edges adjacent to the boundary edge and respectively bounding second fillet faces, the first fillet faces and second fillet faces being two-by two symmetrical with respect to the planar face and having two-by-two a similar fillet radius, the boundary-curve edge, the first chain of edges and a second set of edges belonging to a same concave or convex area; or a boundary-curve edge that does not satisfy criterion d), a first chain of boundary-curve edges adjacent to the boundary-curve edge and respectively bounding first fillet faces, and a second chain of boundary-curve edges adjacent to the boundary edge and respectively bounding second fillet faces, the first fillet faces and second fillet faces intersecting each other two-by-two and having a similar fillet radius, the boundary-curve edge, the first chain of edges and the second set of edges belonging to a same concave or convex area.

8. The method of claim 7, wherein each second extrapolation patch obtained by application of a fillet-connect operator being formed by several faces each bounded by at least one second boundary-curve edge and at least one edge which is outside the first B-Rep model and joins two vertices of the 3D boundary curve.

9. The method of claim 8, wherein application of the surface-extension operator to each first group is constrained by planes at both extremities of the first group, planes delimiting two-by-two respective second groups being each oriented depending on a geometry of the respective second group and on a type of operator applied to said respective second group.

10. The method of claim 1, wherein the first value is between 10 mm and 50 mm and the second value is higher than 2 mm and/or lower than 5 mm.

11. A process for manufacturing a stamping part having one or more flanges, the process comprising:

performing a computer-implemented designing of the stamping part by:

obtaining a first boundary representation (B-Rep) model, the first B-Rep model representing the stamping part without the one or more flanges, the first B-Rep model having a 3D boundary curve formed by a set of boundary-curve edges;

obtaining a first value representing a g1-continuity extrapolation length requirement and a second value representing a g2-continuity extrapolation length requirement;

determining a second B-Rep model representing the stamping part with extra material to be removed to form an unfolded state of the one or more flanges, the second B-Rep model including an extrapolation of the first B-Rep model with extrapolation patches formed along the 3D boundary curve, the second B-Rep model presenting at least a g2-continuity over a length of the extrapolation patches equal to the second value and then at least a g1-continuity over a length of the extrapolation patches equal to the first value, the determination of the second B-Rep model including:

partitioning the set of boundary-curve edges into:

first groups each of one or more consecutive first boundary-curve edges, and second groups each of one or more consecutive second boundary-curve edges, applying a surface-extension operator respectively to each first group, thereby obtaining respective first extrapolation patches formed along the 3D boundary curve and separated by respective gaps, and filling the gaps, thereby obtaining respective second extrapolation patches connecting the first extrapolation patches together and with the first B-Rep at respective second boundary-curve edges, thereby obtaining a B-Rep model representing the stamping part with extra material to be removed to form an unfolded state of the one or more flanges; and using the obtained B-Rep model to produce the stamping part with the extra material.

12. The process of claim 11, further comprising forming the one or more flanges by removing the extra material, and/or folding the one or more flanges.

13. A non-transitory computer readable storage medium having recorded thereon a computer program including instructions for performing a method for designing a stamping part having one or more flanges, the method comprising:

obtaining a first boundary representation (B-Rep) model, the first B-Rep model representing the stamping part without the one or more flanges, the first B-Rep model having a 3D boundary curve formed by a set of boundary-curve edges;

obtaining a first value representing a g1-continuity extrapolation length requirement and a second value representing a g2-continuity extrapolation length requirement; and determining a second B-Rep model representing the stamping part with extra material to be removed to form an unfolded state of the one or more flanges, the second B-Rep model including an extrapolation of the first B-Rep model with extrapolation patches formed along the 3D boundary curve, the second B-Rep model presenting at least a g2-continuity over a length of the extrapolation patches equal to the second value and then at least a g1-continuity over a length of the extrapolation patches equal to the first value, the determination of the second B-Rep model including:

partitioning the set of boundary-curve edges into:

first groups each of one or more consecutive first boundary-curve edges, and second groups each of one or more consecutive second boundary-curve edges, applying a surface-extension operator respectively to each first group, thereby obtaining respective first extrapolation patches formed along the 3D boundary curve and separated by respective gaps, and filling the gaps, thereby obtaining respective second extrapolation patches connecting the first extrapolation patches together and with the first B-Rep at respective second boundary-curve edges.

14. The non-transitory computer readable storage medium of claim 13, wherein the 3D boundary curve includes one or more concave areas and one or more convex areas, at least one convex area including at least one boundary-curve edge of a length higher than a first threshold and lower than a second threshold, the second threshold being higher than the first threshold, each such convex area including a second group.

15. The non-transitory computer readable storage medium of claim 14, wherein, given a 2D convex bounding curve of a projection of vertices of the 3D boundary curve onto a 2D plane, each boundary-curve edge belongs to a concave area of the 3D boundary curve when its projection onto the 2D plane is inside the 2D convex bounding curve, otherwise the boundary-curve edge belongs to a convex area of the 3D boundary curve.

16. The non-transitory computer readable storage medium of claim 15, wherein the 2D plane maximizes an area of a projection of the first B-Rep on the plane.

17. A system comprising:

a processor coupled to a memory, the memory having recorded thereon a computer program including instructions for designing a stamping part having one or more flanges that when executed by the processor causes the processor to be configured to:

obtain a first boundary representation (B-Rep) model, the first B-Rep model representing the stamping part without the one or more flanges, the first B-Rep model having a 3D boundary curve formed by a set of boundary-curve edges, obtain a first value representing a g1-continuity extrapolation length requirement and a second value representing a g2-continuity extrapolation length requirement, and determine a second B-Rep model representing the stamping part with extra material to be removed to form an unfolded state of the one or more flanges, the second B-Rep model including an extrapolation of the first B-Rep model with extrapolation patches formed along the 3D boundary curve, the second B-Rep model presenting at least a g2-continuity over a length of the extrapolation patches equal to the second value and then at least a g1-continuity over a length of the extrapolation patches equal to the first value, the determination of the second B-Rep model including the processor being configured to:

partition the set of boundary-curve edges into:

first groups each of one or more consecutive first boundary-curve edges, and second groups each of one or more consecutive second boundary-curve edges, apply a surface-extension operator respectively to each first group, thereby obtaining respective first extrapolation patches formed along the 3D boundary curve and separated by respective gaps, and fill the gaps, thereby obtaining respective second extrapolation patches connecting the first extrapolation patches together and with the first B-Rep at respective second boundary-curve edges.

18. The system of claim 17, wherein the 3D boundary curve includes one or more concave areas and one or more convex areas, at least one convex area including at least one boundary-curve edge of a length higher than a first threshold and lower than a second threshold, the second threshold being higher than the first threshold, each such convex area including a second group.

19. The system of claim 18, wherein, given a 2D convex bounding curve of a projection of vertices of the 3D boundary curve onto a 2D plane, each boundary-curve edge belongs to a concave area of the 3D boundary curve if its projection onto the 2D plane is inside the 2D convex bounding curve, otherwise the boundary-curve edge belongs to a convex area of the 3D boundary curve.

20. The system of claim 19, wherein the 2D plane maximizes an area of a projection of the first B-Rep on the plane.

* * * * *